US009753240B2

United States Patent
Reagan et al.

(10) Patent No.: US 9,753,240 B2
(45) Date of Patent: Sep. 5, 2017

(54) SPLITTER MODULES AND OPTICAL COMPONENT MODULE MOUNTING ASSEMBLIES

(71) Applicant: OPTERNA TECHNOLOGY LIMITED, Limerick (IE)

(72) Inventors: Randy Reagan, Morristown, NJ (US); Jiju Koratten, Cochin (IN); Biji Mathew Arakkakudy, Cochin (IN); Benoy Sarasan, Cochin (IN); Kizhakkekuttu Parameswaran Chandran, Cochin (IN); Basheer A. Alikunju, Cochin (IN)

(73) Assignee: Opterna Technology Limited, Limerick (IE)

( * ) Notice: Subject to any disclaimer, the term of this patent is extended or adjusted under 35 U.S.C. 154(b) by 0 days.

(21) Appl. No.: 15/199,155

(22) Filed: Jun. 30, 2016

(65) Prior Publication Data

US 2016/0313528 A1    Oct. 27, 2016

Related U.S. Application Data

(63) Continuation of application No. 14/372,349, filed as application No. PCT/IB2013/000828 on Jan. 17, 2013, now Pat. No. 9,389,385.

(Continued)

(51) Int. Cl.
*G02B 6/44* (2006.01)
*G02B 6/36* (2006.01)

(52) U.S. Cl.
CPC ............ *G02B 6/4471* (2013.01); *G02B 6/36* (2013.01); *G02B 6/3616* (2013.01); *G02B 6/444* (2013.01);

(Continued)

(58) Field of Classification Search
CPC .................................................. G02B 6/4471
See application file for complete search history.

(56) References Cited

U.S. PATENT DOCUMENTS 6,647,197 B1    11/2003   Marrs et al.
7,376,325 B1    5/2008    Cloud et al.
(Continued)

FOREIGN PATENT DOCUMENTS

WO    WO 2010/036549 A1    4/2010
WO    WO 2012/138856 A1    10/2012

OTHER PUBLICATIONS

Communication pursuant to Article 94(3) EPC for Appl. No. 13 722 061.2, European Patent Office, mailed Mar. 22, 2016.
(Continued)

*Primary Examiner* — Thomas A Hollweg
*Assistant Examiner* — Mary A El Shammaa
(74) *Attorney, Agent, or Firm* — Sterne, Kessler, Goldstein & Fox P.L.L.C.

(57) ABSTRACT

A fiber optic module mounting assembly can include a surface defining an opening and a module holder. The module holder includes a body defining a channel. The body has a cross-sectional shape closely corresponding to a cross-sectional shape of the opening defined by the surface. The module holder creates a snap or friction fit with the surface when the module holder is received within the opening of the surface, thereby coupling the module holder to the surface. The mounting assembly also includes a module comprising a housing having a cross-sectional shape closely corresponding to a cross-sectional shape of the channel of the module holder, and an optical component within the housing. The module is configured to be received within the channel defined by the body of the module holder.

18 Claims, 15 Drawing Sheets

Related U.S. Application Data

(60) Provisional application No. 61/704,957, filed on Sep. 24, 2012, provisional application No. 61/588,018, filed on Jan. 18, 2012.

(52) U.S. Cl.
CPC ......... *G02B 6/4452* (2013.01); *G02B 6/4478* (2013.01); *G02B 6/4444* (2013.01)

(56) References Cited

U.S. PATENT DOCUMENTS

| | | |
|---|---|---|
| 2004/0105633 A1 | 6/2004 | Ishikawa et al. |
| 2008/0232067 A1 | 9/2008 | Joiner et al. |
| 2009/0297159 A1 | 12/2009 | Margolin et al. |
| 2010/0129028 A1 | 5/2010 | Nhep et al. |
| 2010/0278498 A1* | 11/2010 | Zimmel ............... G02B 6/4453 385/135 |

OTHER PUBLICATIONS

International Search Report for PCT/IB2013/000828, European Patent Office, mailed Sep. 6, 2013 (6 pages).

\* cited by examiner

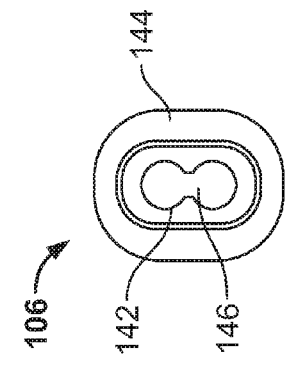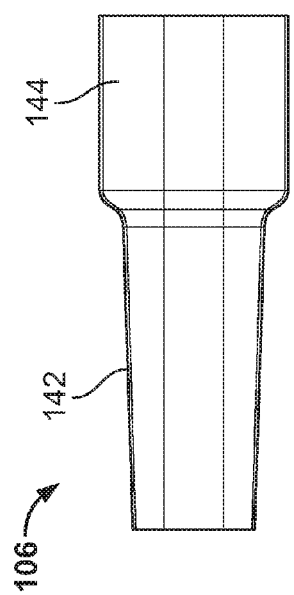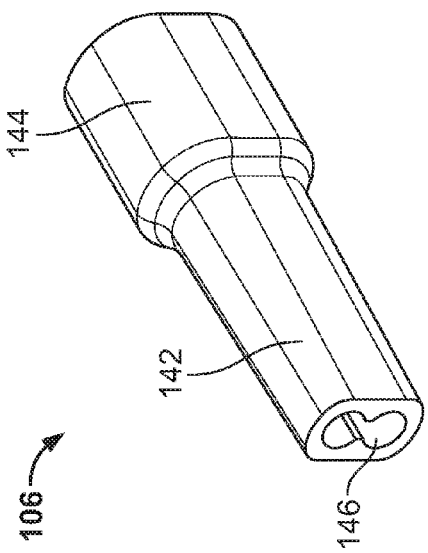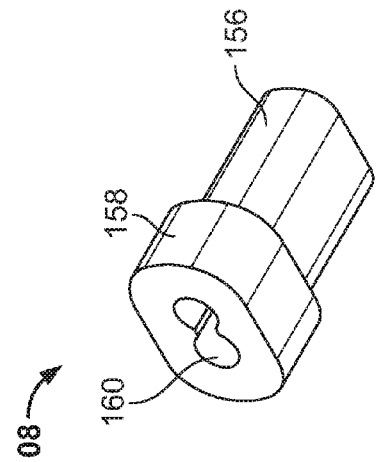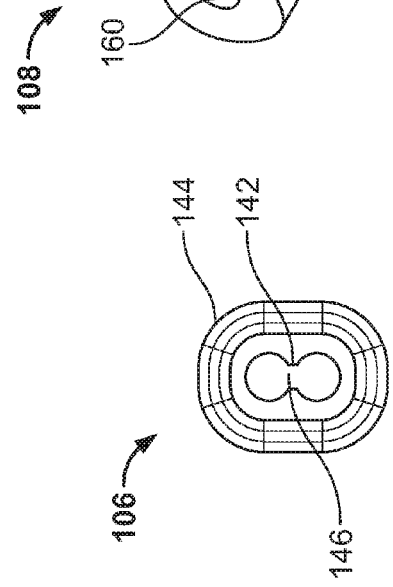

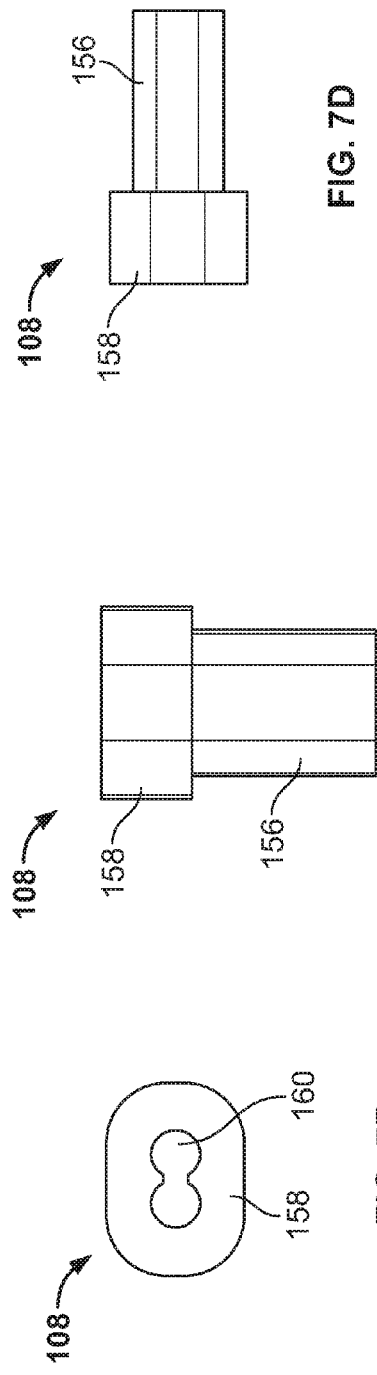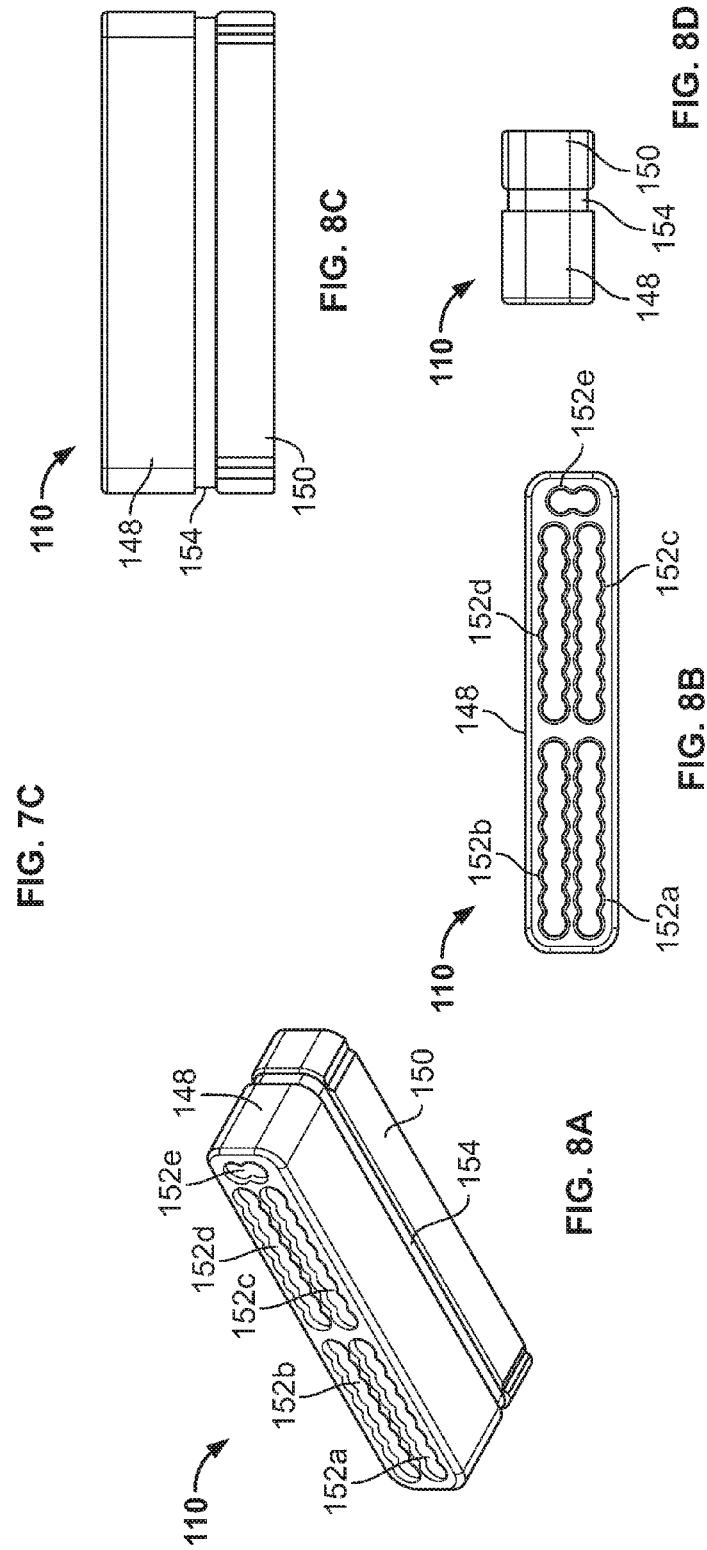

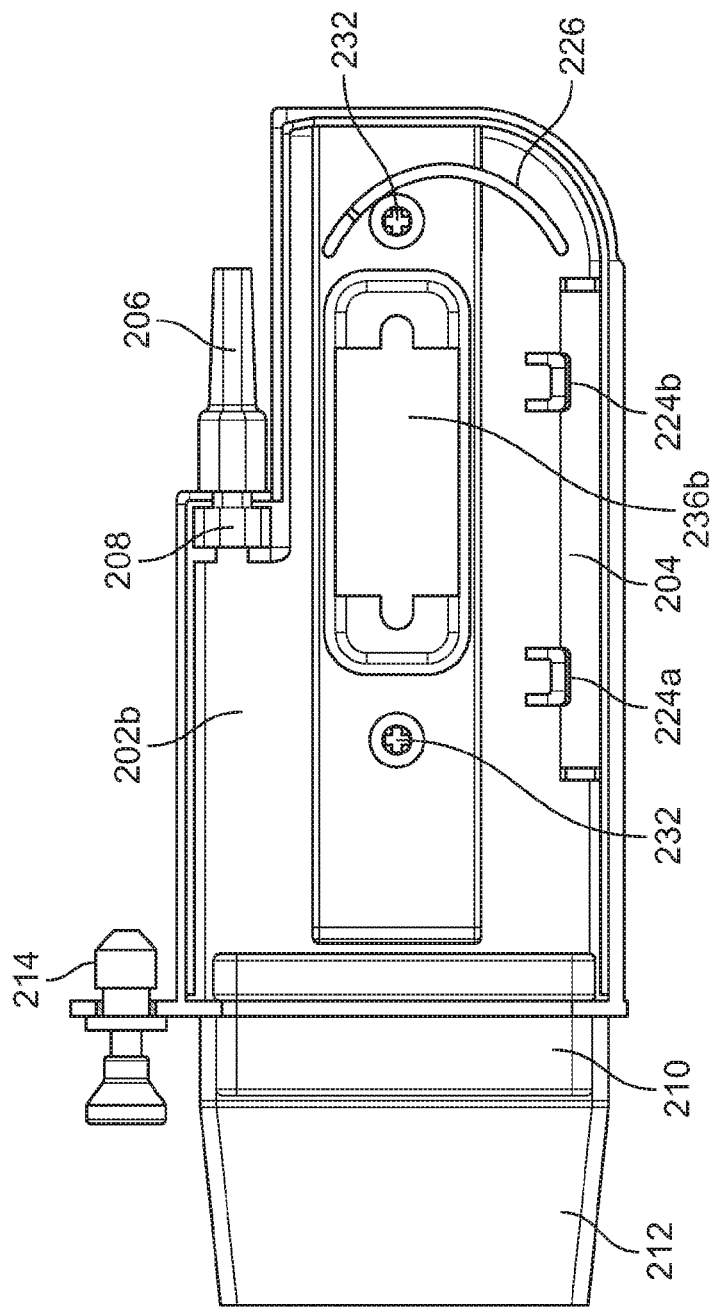
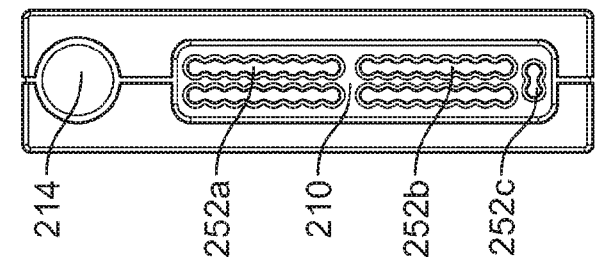
FIG. 10

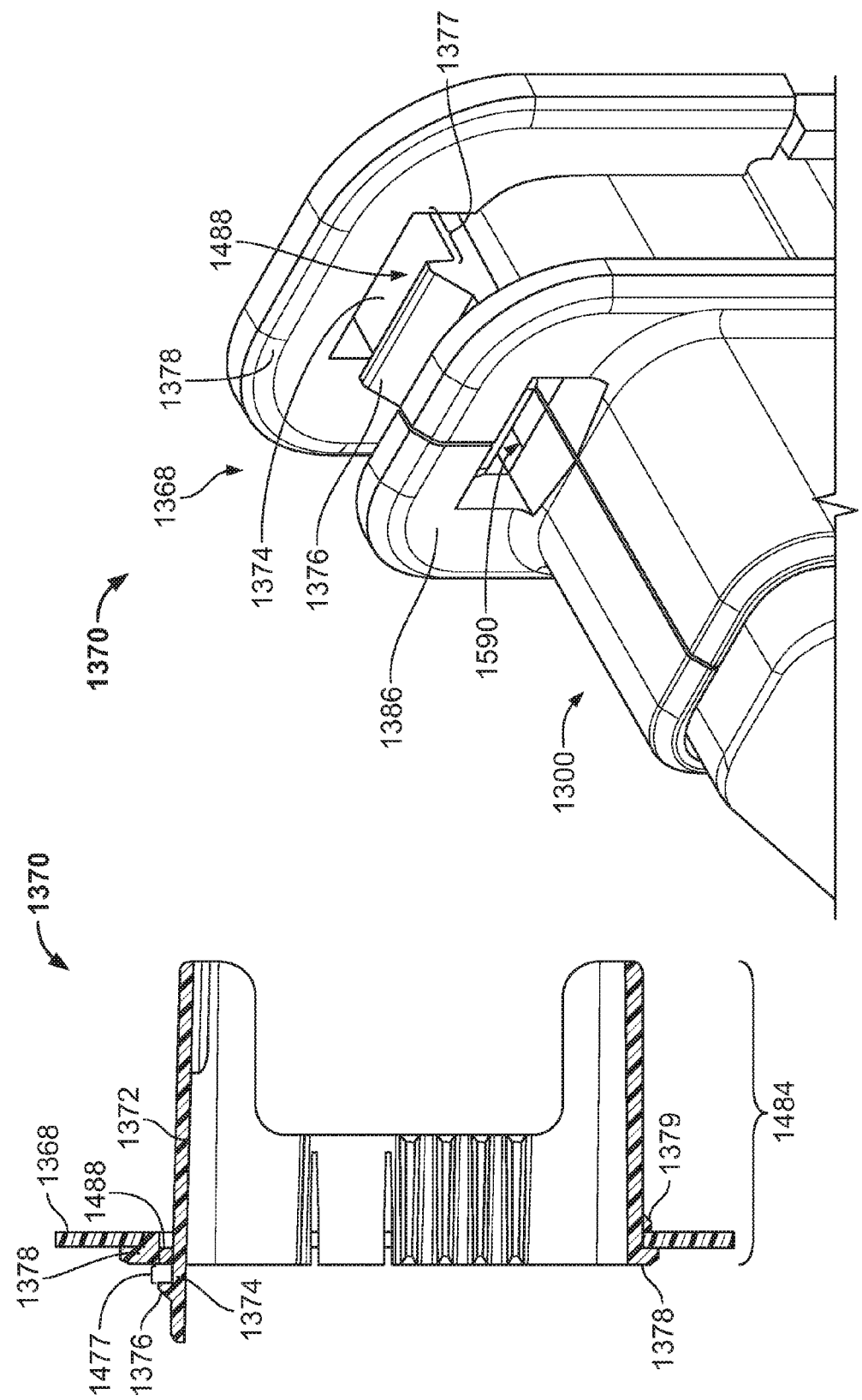

SPLITTER MODULES AND OPTICAL COMPONENT MODULE MOUNTING ASSEMBLIES

CROSS-REFERENCE TO RELATED APPLICATIONS

This application is a continuation of U.S. application Ser. No. 14/372,349, having a 371(c) date of Jul. 15, 2014, which is a U.S. national phase entry of International Application No. PCT/IB2013/000828, which claims the benefit of (1) U.S. Provisional Application No. 61/704,957, filed Sep. 24, 2012, and (2) U.S. Provisional Application No. 61/588,018, filed Jan. 18, 2012. Each of these applications is incorporated by reference herein.

BACKGROUND

Field

The present invention relates to optical devices used in fiber optic systems and particularly to splitter modules.

Background Art

In fiber optic systems, splitters are used to split an incoming optical signal into two or more output optical signals. For example, in fiber-to-the-premises applications, splitters are used in fiber distribution hubs to split an incoming optical signal from the central office into a plurality of output optical signals going to the end subscriber. In such applications, the splitters are often contained within housings that are coupled to the fiber distribution hub. Because fiber distribution hubs typically include a large number of splitters, the splitters require a large amount of space within the enclosure of the fiber distribution hub. But space is at a premium in high-density fiber optic networks. Accordingly, there is a need for splitter modules that are compact and have good optical performance in insertion loss, reflection loss, and uniformity.

SUMMARY

Embodiments of the invention relate to a splitter module that includes an optical splitter configured for splitting an input optical signal into two or more output optical signals. The splitter module also includes a housing that encloses the optical splitter. The housing has a first end and a second end, and defines a first opening facing the first end and a second opening at the second end. The splitter module includes an input boot configured to receive one or more input fiber cables and an input fan-out mounted at the first opening and coupled to the input boot. The splitter module further includes an output fan-out mounted at the second opening, and an output boot coupled to the output fan-out.

Embodiments of the invention relate to a fiber optic component module mounting assembly that includes an optical component module and an optical component module holder sized to be received within an opening of a mounting surface. The mounting assembly also includes a main body defining a channel. The channel is configured to closely receive the optical component module. The mounting assembly further includes a latch configured to selectively engage the optical component module such that movement of the optical component module relative to the optical component module holder is prevented.

BRIEF DESCRIPTION OF THE DRAWINGS

Embodiments of the invention will now be described, by way of example only, with reference to the accompanying schematic drawings in which corresponding reference symbols indicate corresponding parts.

FIGS. 6A-6E are a perspective view, a side view, a proximal view, a top view, and a distal view, respectively, of a first boot as illustrated in FIG. 1.

FIGS. 7A-7D are a perspective view, a proximal view, a top view, and a side view, respectively, of a first fan-out as illustrated in FIG. 1.

FIGS. 8A-8D are a perspective view, a distal view, a top view, and a side view, respectively, of a second fan-out as illustrated in FIG. 1.

FIG. 10 is a plan view of splitter module with one portion of the housing removed.

FIG. 14 is a cross-sectional view of the splitter module holder illustrated in FIG. 13.

FIG. 15 is a perspective view of the splitter module and splitter module holder illustrated in FIGS. 13 and 14.

DETAILED DESCRIPTION

While the invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
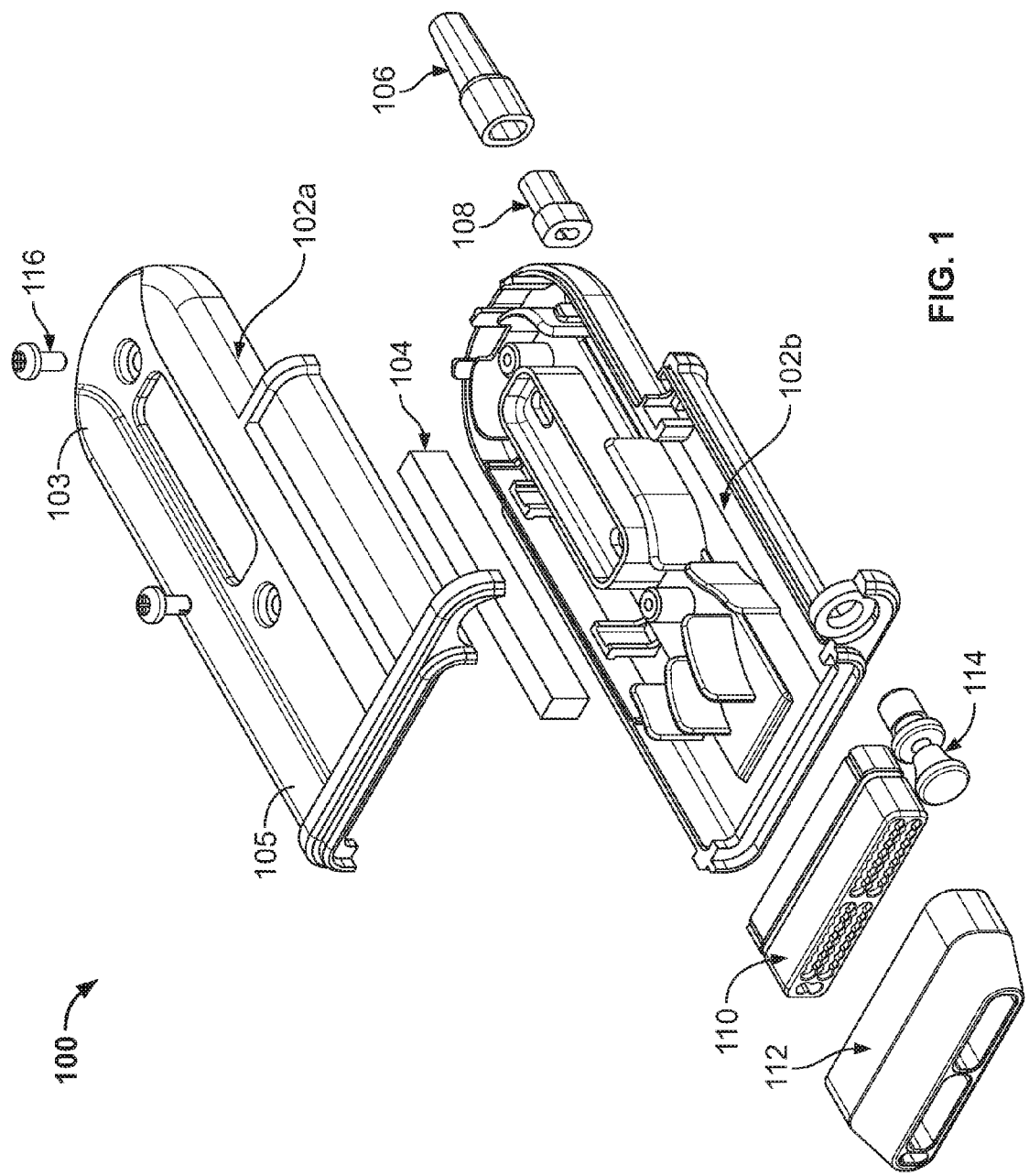
FIG. 1 depicts an exploded, perspective view of a splitter module.

FIG. 1 depicts an exploded side perspective view of a splitter module 100. Splitter module 100 is configured to split an optical signal from one or more incoming fiber optic cables (not shown) into two or more optical output signals transmitted through two or more output fiber optic cables (not shown). Splitter module 100 includes a housing composed of a first housing portion 102a and a second housing portion 102b (collectively referred to as housing 102), an optical splitter 104, an input boot 106, an input fan-out 108, an output fan-out 110, an output boot 112, and a locking device 114.

Housing 102 encloses the internal components of splitter module 100, including optical splitter 104. Enclosing the internal components protects these components from being exposed to dirt or other contaminates as well as protects these components from external forces to which the splitter module may be subjected to during installation and/or use. Housing 102 can be made of any suitable rigid or semi-rigid material. For example, housing 102 can be made of plastic, metal, or any other suitable material capable of withstanding the forces typically applied to splitter modules.

Housing 102 has a generally rectangular shape when viewed from the side. Housing 102 includes a first end 103 and a second end 105. As shown in FIGS. 1-5, housing 102 includes first housing portion 102a and second housing portion 102b. First housing portion 102a and second housing portion 102b can be selectively coupled to each other, for example, by using fasteners or a press or snap fit, or permanently coupled to each other, for example, by using adhesives.

Figure 2:
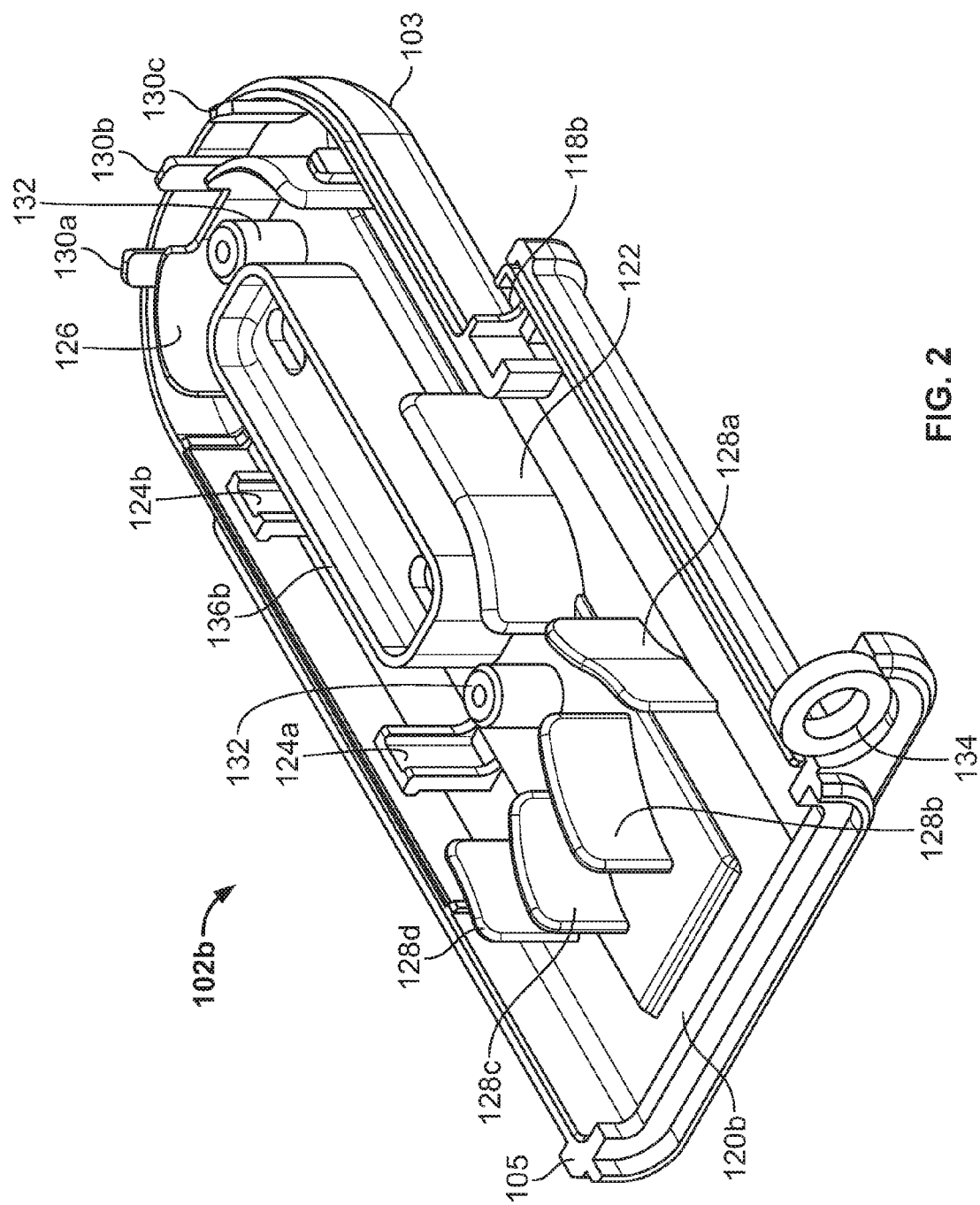
FIG. 2 is a perspective view of a portion of a housing as illustrated in FIG. 1.

FIG. 2 is a perspective view of the second housing portion 102b as illustrated in FIG. 1. Housing portion 102b defines a first opening 118b that allows one or more fiber optic cables (not shown) to enter housing 102. For example, one or more fiber optic cables may enter housing 102 through opening 118b. First opening 118b is between first end 103 and second end 105 of housing portion 102b. First opening 118b faces first end 103 of housing 102.

In other embodiments, first opening 118b can be located at or close to first end 103 of housing 102.

Figure 3:
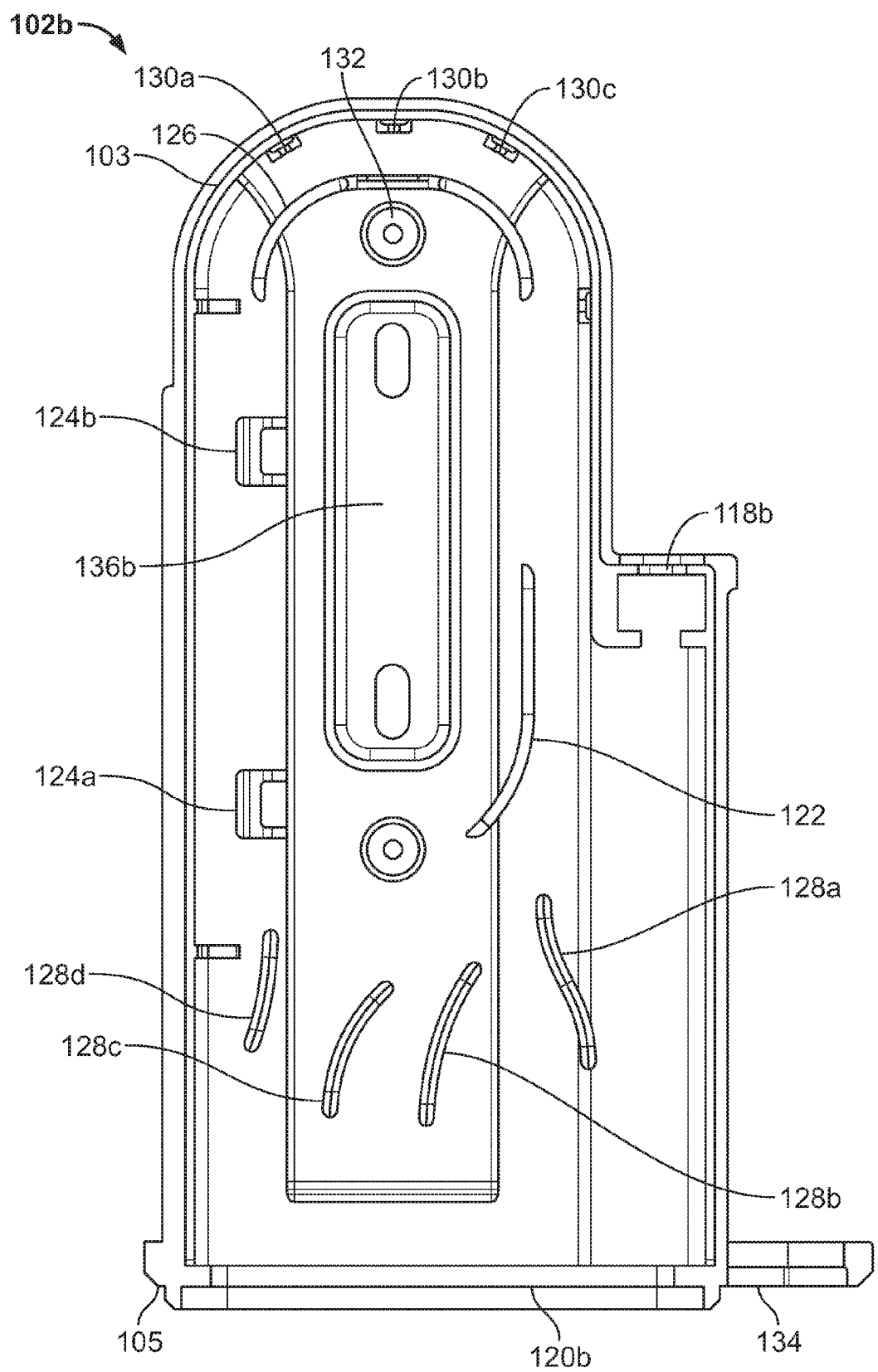
FIG. 3 is a plan view of the portion of the housing illustrated in FIGS. 1-2.

The incoming fiber optic cable(s) enter through opening 118b and are routed to optical splitter 104 (not shown in FIGS. 2 and 3). Optical splitter 104 splits the optical signal in the incoming fiber optic cable(s) into two or more optical signals transmitted through two or more output fiber optic cables. For example, optical splitter 104 can split an optical signal from one incoming fiber optic cable into two, four, eight, sixteen, thirty-two, or sixty-four signals. In another example, optical splitter 104 splits two optical signals from two incoming fiber optic cables into four, eight, sixteen, or thirty-two optical output signals. Optical splitter 104 can be a planar lightwave circuit splitter or any other suitable optical splitter capable of splitting an optical signal into two or more output optical signals. The number of incoming fiber optic cables described here is exemplary only. The use of a different number of incoming cables would be readily apparent to one skilled in the relevant art.

Housing portion 102b includes a retaining mechanism for securing optical splitter 104 within housing 102. As shown in FIG. 2, housing portion 102b includes retention posts 124a and 124b that extend from the inner surface of housing's sidewall. The distal end of retention posts 124a and 124b have a flange that clamps optical splitter 104 against the sidewall of housing portion 102b. In other embodiments, housing portion 102b can include only one retention post or more than two retention posts.

The split fiber optic output cables (not shown) exit optical splitter 104 and travel against a first cable guide 126. First cable guide 126 extends from the inner surface of the housing's sidewall at first end 103. As shown in FIGS. 1 and 2, first cable guide 126 is substantially semi-circular and substantially concentric with the housing's outer wall. The curved portions of first cable guide 126 have a radius greater than the minimum bend radius of the split fiber optic cables.

After first cable guide 126, the split fiber optic cables travel to a second cable guide 122. Second cable guide 122 extends from the inner surface of housing's sidewall. Second cable guide 122 is about half way between the housing's first end 103 and second end 105. The radius of any curved portion of second cable guide 122 is greater than the minimum bend radius of the split fiber optic cables. As shown in FIG. 3, second cable guide 122 may be essentially J-shaped.

Between second cable guide 122 and second end 105 of housing 102 are one or more terminal cable guides that extend from the inner surface of the housing's sidewall. The terminal cable guides spread out the split fiber optic cables across the width of housing 102 before reaching second end 105 of housing 102. In one example, as shown in FIGS. 2 and 3, housing portion 102b includes four terminal cable guides 128a, 128b, 128c, and 128d (collectively referred to as terminal cable guides 128). First terminal cable guide 128a may have an elongated S-shape, and second, third, and fourth terminal cable guides 128b, 128c, and 128d may be substantially arcuate. The curved portions of terminal cable guides 128a, 128b, 128c, and 128d have a radius greater than the minimum bend radius of the split fiber optic cables.

Housing portion 102b also defines a second opening 120b at or close to second end 105. Second opening 120b allows the split fiber optic cables to exit housing 102. One or more alignment pins extend from housing portion 102b. As illustrated in FIGS. 2 and 3, three alignment pins 130a, 130b, and 130c (collectively referred to as alignment pins 130) extend from housing portion 102b. Alignment pins 130a, 130b, and 103c are configured to be received by the other housing portion 102a, which ensures that housing portion 102b is properly aligned with housing portion 102a.

Housing portion 102b further includes one or more fastener receptacles 132. Each fastener receptacle 132 is configured to securely receive a fastener extending from housing portion 102a to couple housing portion 102a with housing portion 102b.

Housing portion 102b also defines an indentation 136b. In some embodiments, indentation 136b strengthens housing 102. In some embodiments, indentation 136b provides an area for a user's fingers to be received when splitter module 100 is being installed. Indentation 136b is substantially rectangular. In other embodiments, indentation 136b can be other suitable shapes that allow for the placement of a user's fingers while the splitter module is installed.

Additionally, housing portion 102b has a locking tab 134. Locking tab 134 extends outward from the outer surface of the housing's outer wall. Locking tab 134 defines an opening for receiving locking device 114.

Figure 4:
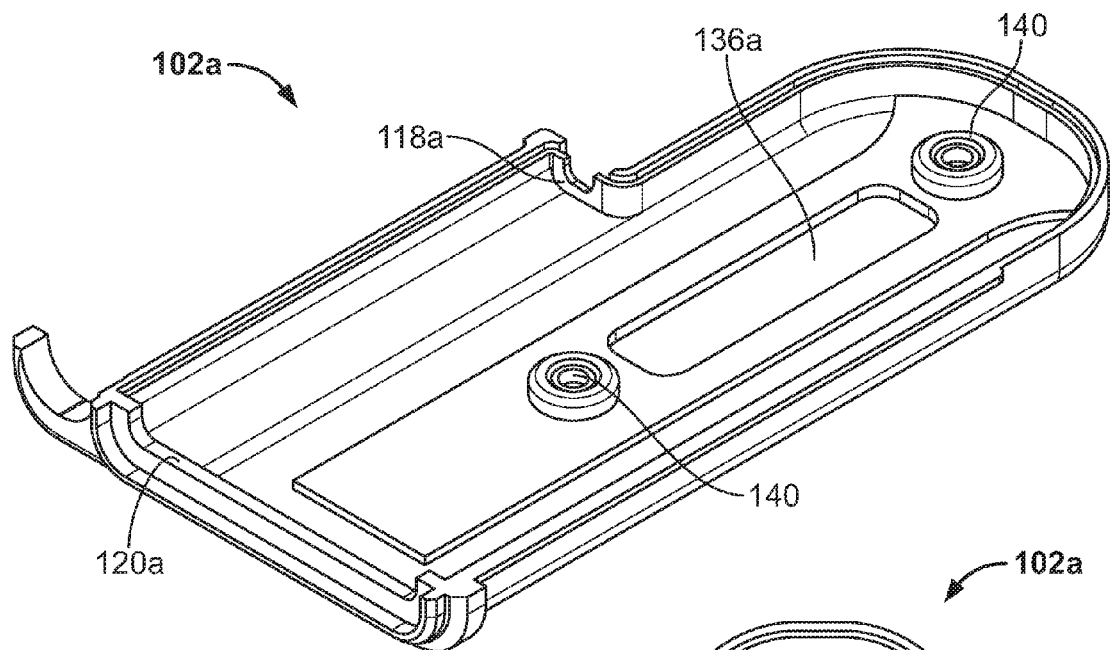
FIG. 4 is a perspective view of the other portion of the housing as illustrated in FIG. 1.
Figure 5:
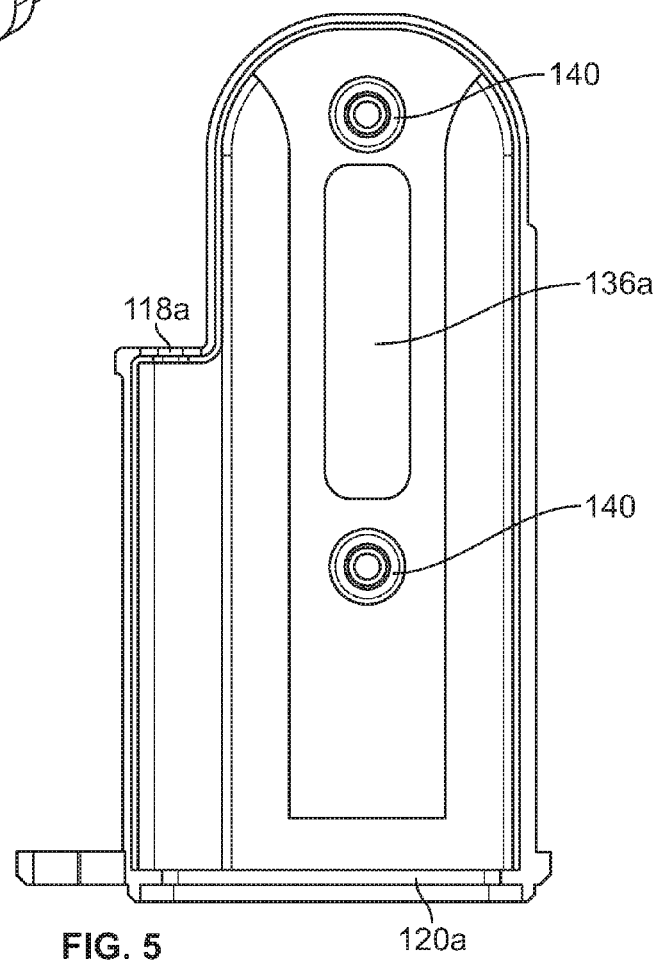
FIG. 5 is a plan view of the housing portion illustrated in FIGS. 1 and 4.

FIGS. 4 and 5 illustrate first housing portion 102a of the splitter's housing 102. Housing portion 102a is substantially a mirror image of housing portion 102b. Housing portion 102a defines an opening 118a. Opening 118a aligns with opening 118b of housing portion 102b when housing portions 102a and 102b are coupled, collectively forming an opening in housing 102 referred to as opening 118. Similarly, housing portion 102a defines opening 120a that aligns with opening 120b of housing portion 102b when housing portions 102a and 102b are coupled. Housing portion 102b further defines one or more openings 140 for receiving a fastener. Openings 140 are aligned with fastener receptacles 132 of housing portion 102b when housing portions 102a and 102b are coupled. Accordingly, a fastener, such as a screw, bolt, or any other suitable fastener, passes through opening 140 and into secure engagement with a fastener receptacle 132, securing housing portion 102a to housing portion 102b.

Housing portion 102a further defines an opening 136a that corresponds with indentation 136b in housing portion 102b. Accordingly, when housing portions 102a and 102b are coupled, a user's fingers can pass through opening 136a of housing portion 102a and into indentation 136b in housing portion 102b.

Although FIGS. 1-5 illustrate housing 102 as two halves—housing portion 102a and housing portion 102b—housing 102 can be formed of two or more portions that are not mirror image halves.

Splitter module 100 also includes input boot 106 as shown in FIGS. 1 and 6A-6E. Input boot 106 is configured to receive one or more fiber optic cables. Input boot 106 prevents the incoming fiber optic cables from substantially bending relative to housing 102. Input boot 106 can be made from any suitable resilient material, for example, silicon rubber.

Input boot 106 includes a distal portion 142 and a proximal portion 144. Collectively, distal and proximal portions 142 and 144 define a channel 146 for passing the incoming fiber optic cable(s). The opening of channel 146 at distal portion 142 is configured to closely receive the fiber optic cable(s). As shown in FIGS. 6A, 6C, and 6E, the distal portion 142 can be configured to closely receive two fiber optic cables, and thus the opening at the distal portion 142 has a figure-eight shape. The opening of channel 146 at proximal portion 144 is configured for a press fit with input fan-out 108. As best seen in FIG. 6B, distal portion 142 has a tapered outer profile when viewed from the side.

Splitter module 100 also includes input fan-out 108, which has a distal portion 156 and a proximal portion 158 as shown in FIGS. 7A-7D. Distal portion 156 and proximal portion 158 define a channel 160 for passing the fiber optic cable(s). Channel 160 has a contour that corresponds to the shape of channel 146 at distal portion 142. In some embodiments, channel 160 has a figure-eight contour. It would be apparent to one skilled in the relevant art that other contours could be used. The outer surface of distal portion 156 is sized to closely receive proximal portion 144 of input boot 106 for a press fit. In other embodiments, distal portion 156 can be configured for a snap-fit or a screw fit with input boot 106. Distal portion 156 is sized to closely pass through opening 118 of housing 102. The width of proximal portion 158 is greater than the width of distal portion 156 such that when distal portion 156 passes through opening 118, proximal portion 158 cannot pass through opening 118.

Splitter module 100 further comprises an output fan-out 110. Output fan-out 110 has a distal portion 148 and a proximal portion 150 as shown in FIGS. 8A-8D. A groove 154 is interspaced around the outer surface of fan-out 110 between distal and proximal portions 148 and 150. Fan-out 110 defines one or more channels configured to closely receive the split fiber optic cables. The channels are configured to spatially arrange the split fiber optic cables as desired. As shown in FIGS. 8A and 8B, fan-out 110 defines five channels 152a, 152b, 152c, 152d, and 152e (collectively referred to as channels 152). Each of channels 152a, 152b, 152c, and 152d is configured to receive a plurality of split fiber optic cables, for example, eight fiber optic cables. Channels 152a, 152b, 152c, and 152d are shaped as a series of overlapping circles. Channel 152e is configured to receive one or more fiber optic cables, for example, two fiber optic cables. Groove 154 is sized to closely accept the portions of housing portions 102a and 102b that define openings 120a and 120b. This interface prevents fan-out 110 from moving away from housing 102.

Figure 9A:
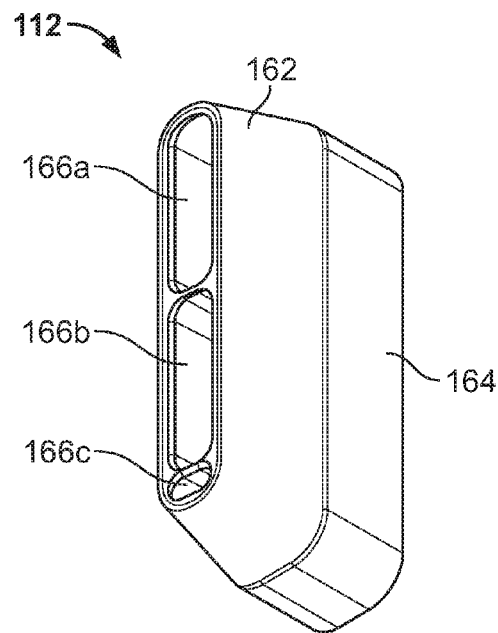
FIGS. 9A-9D are a perspective view, a distal view, a top view, and a side view, respectively, of a second boot as illustrated in FIG. 1.
Figure 9B:
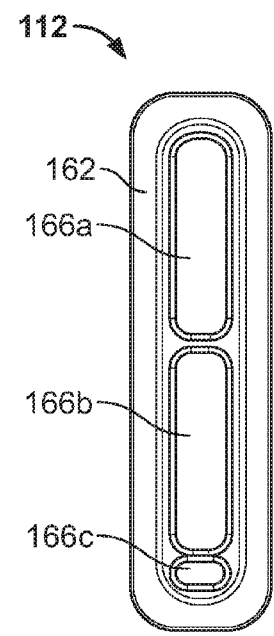
Figure 9C:
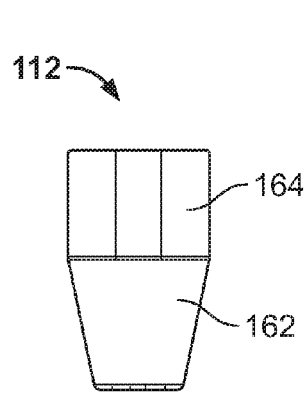
Figure 9D:
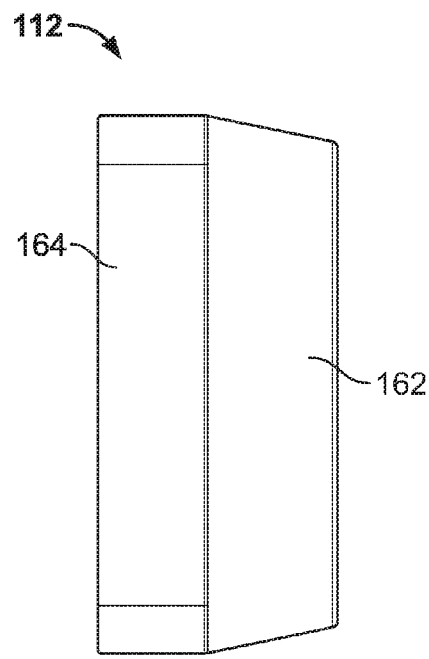

Further, splitter module 100 includes output boot 112 as shown in FIGS. 9A-9D. Output boot 112 includes a distal portion 162 and a proximal portion 164. Output boot 112 defines one or more openings 166 for passing the plurality of split fiber optic cables exiting splitter module 100. As best seen in FIGS. 9A and 9B, output boot 112 defines three openings 166a, 166b, and 166c. The shape of opening 166a generally corresponds to the foot print of channels 152a and 152b of fan-out 110 (i.e., generally rectangular), and the shape of opening 166b generally corresponds to the foot print of channels 152c and 152d of fan-out 110 (i.e., generally rectangular). Similarly, the shape of opening 166c generally corresponds to the foot print of channel 152e of fan-out 110. Output boot 112 prevents the incoming split fiber optic cables from substantially bending relative to housing 102. Output boot 112 can be made from any suitable resilient material, for example, silicon rubber. The profile of distal portion 162 is tapered when viewed from the top and from the side.

Splitter module 100 may also include locking device 114 that is configured to selectively and securely couple splitter module 100 to the desired fiber optic equipment, for example, a fiber distribution hub or other fiber optic system. Locking device 114 may be a latching pin having a head sized for a snap fit with an opening on the fiber optic equipment to secure splitter module 100 to the fiber optic equipment. In other embodiments, locking device 114 may be a pin having an expandable head that can expand against an opening the fiber optic equipment, a fastener such as a screw or bolt, or any other suitable locking device.

In some embodiments, instead of entering housing 102 via opening 118, incoming fiber optic cable(s) enter housing 102 via channel 152e of fan-out device 110 and opening 166c of output boot 112.

FIG. 10 depicts a plan view of another embodiment of a splitter module 200. Splitter module 200 includes similar components as the above described splitter module 100, which are similarly numbered. Namely, splitter module 200 includes a housing 202 made of first housing portion (not shown) and second housing portion 202b, an optical splitter 204, an input boot 206, an input fan-out 208, an output fan-out 210, an output boot 212, and a locking device 214. In this embodiment, housing portion 202b does not include cable guides that correspond to second cable guide 122 and the plurality of terminal cable guides 128 of splitter module 100. Also, instead of indentation 136b, housing portion 202b defines a through channel 236b.

Figure 11:
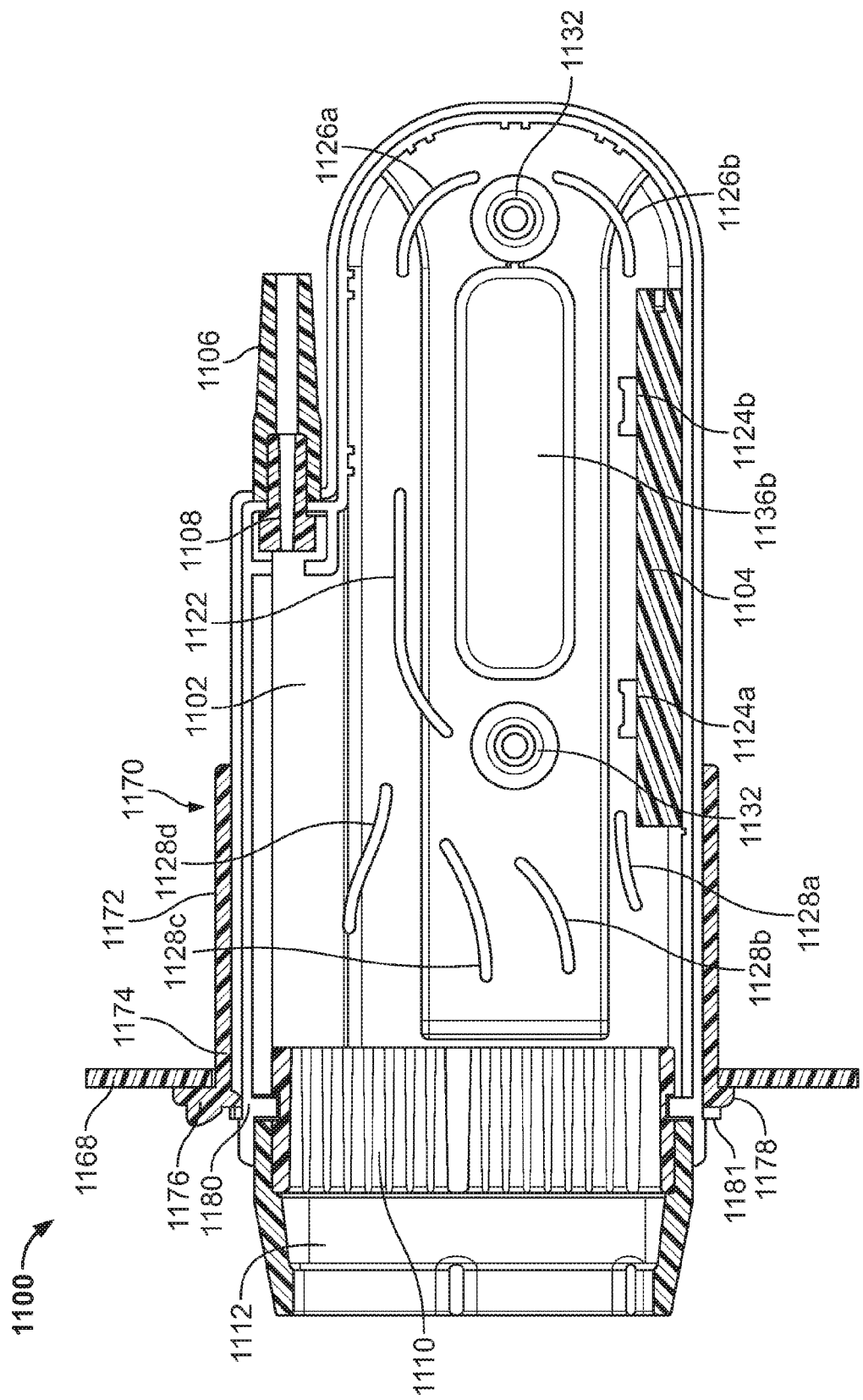
FIG. 11 is a plan view of a splitter module according to another embodiment and a splitter module holder according to an embodiment.
Figure 12:
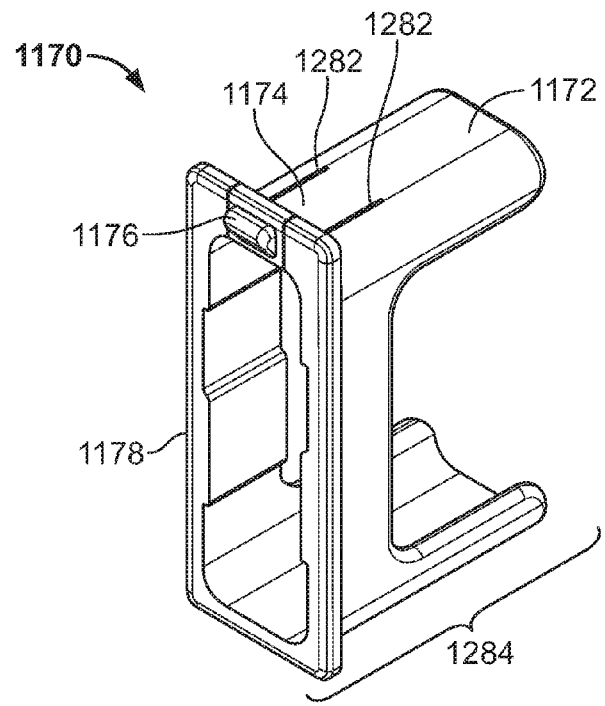
FIG. 12 is a perspective view of the splitter module as illustrated in FIG. 11.

FIG. 11 depicts a plan view of an optical component module mounting assembly. In the embodiment illustrated in FIG. 11, the optical component module mounting assembly includes a splitter module 1100 and a module holder 1170. FIG. 12 illustrates a perspective view of module holder 1170.

As shown in FIG. 11, splitter module 1100 includes similar components as the above described splitter modules 100 and 200. These components are similarly numbered. Namely, splitter module 1100 includes a housing 1102, an optical splitter 1104, an input boot 1106, an input fan-out 1108, an output fan-out 1110, and an output boot 1112. In this embodiment, housing 1102 includes cable guides 1126a and 1126b, and a plurality of terminal cable guides 1128a, 1128b, 1128c, and 1128d. Also, instead of indentation 136b of splitter module 100, housing 1102 defines a through channel 1136.

In some embodiments, as shown in FIG. 11, instead of using a latching pin to directly couple splitter module 1100 to a mounting surface 1168, splitter module 1100 is configured to selectively couple with module holder 1170 that is configured to be coupled to mounting surface 1168. In turn, splitter module 1100 is securely mounted to mounting surface 1168.

In some embodiments, as shown in FIG. 11, mounting surface 1168 can define an opening, and module holder 1170 can be sized to be closely received within the opening defined by mounting surface 1168. In some embodiments, module holder 1170 is sized and shaped to achieve a friction fit or a snap fit with mounting surface 1168. In other embodiments, module holder 1170 is secured to mounting surface 1168 using any other suitable attachment method, for example, by using fasteners or adhesives.

As shown in FIG. 11, module holder 1170 includes a main body 1172 that defines a channel. The shape of the channel defined by main body 1172 closely corresponds to the shape of splitter module 1100. For example, as shown in FIG. 12, main body 1172 can define a generally rectangular channel sized to closely receive generally rectangular splitter module 1100. Accordingly, splitter module 1100 can slide within the channel defined by main body 1172.

Module holder 1170 can also include a latch for selectively engaging splitter module 1100 to substantially prevent splitter module 1100 from moving relative to module holder 1170, which effectively secures splitter module 1100 to mounting surface 1168 to which module holder 1170 is attached. In some embodiments, when splitter module 1100 is coupled with module holder 1170, splitter module 1100 is substantially prevented from both translating and rotating relative to module holder 1170.

In some embodiments, the latch can be a spring arm 1174 that selectively engages splitter module 1100. For example, as shown in FIG. 12, main body 1172 of holder 1170 can define a pair of slots 1282, and the portion of main body 1172 between slots 1282 form spring arm 1174. Spring arm 1174 is configured to create a snap fit with splitter module 1100. Spring arm 1174 is resilient such that spring arm 1174 recoils after being flexed away from or towards the center of the channel defined by main body 1172.

In some embodiments, spring arm 1174 is biased towards a center of the channel defined by main body 1172 such that spring arm 1174 contacts splitter module 1100 as splitter module is inserted in holder 1170.

In some embodiments, spring arm 1174 includes a protrusion 1176 that extends away from the surface of spring arm 1174 towards the center of the channel defined by main body 1172. Splitter module 1100 can include a groove 1180 defined by housing 1102 of splitter module 1100. Groove 1180 is sized and shaped to closely receive protrusion 1176 to create a snap fit between splitter module 1100 and module holder 1170. The snap fit substantially prevents movement of splitter module 1100 relative to module holder 1170, which effectively secures splitter module 1100 to mounting surface 1168. In some embodiments, the bias of spring arm 1174 causes protrusion 1176 to enter groove 1180 when splitter module 1100 is slid to a position at which groove 1180 is aligned with protrusion 1176.

In some embodiments, splitter module 1100 can include a mounting flange 1181 extending outward from an outer surface of housing 1102. Accordingly, when splitter module 1100 is inserted through the channel defined by main body 1172 of module holder 1170, a surface of mounting flange 1181 contacts a surface of module holder 1170, for example, a surface of mounting flange 1178 of module holder 1170, or mounting surface 1168. This engagement can prevent splitter module 1100 from being further inserted through the channel defined by main body 1172 of module holder 1170. In some embodiments, mounting flange 1181 extends around the entire periphery of housing 1102 of splitter module 1100. In some embodiments, mounting flange 1181 extends around a portion of the periphery of housing 1102.

As best seen in FIG. 12, holder 1170 has a length 1284. In some embodiments, length 1284 is sufficient to substantially prevent rotation of splitter module 1100 relative to mounting surface 1168. For example, in some embodiments, length 1284 is equal to or greater than about twenty percent of the length of housing 1102 of splitter module 1100. In some embodiments, length 1284 is about twenty-five percent of the length of housing 1102 of splitter module 1100. In some embodiments, length 1284 is about one-third the length of housing 1102 of splitter module 1100. Accordingly, one end of splitter module 1100 extends past the corresponding end of module holder 1170 when splitter module 1100 is coupled with module holder 1170.

In some embodiments, module holder 1170 includes a mounting flange 1178. Mounting flange 1178 extends outward from a surface of main body 1172. Accordingly, when main body 1172 is inserted through the opening defined in mounting surface 1168, a surface of mounting flange 1178 contacts mounting surface 1168, preventing further insertion of holder 1170 through the opening defined in mounting surface 1168. In some embodiments, mounting flange 1178 extends around the entire periphery of main body 1172 of holder 1170. In some embodiments, mounting flange 1178 extends around a portion of the periphery of main body 1172. In some embodiments, spring arm 1174 forms a portion of mounting flange 1178.

Figure 13:
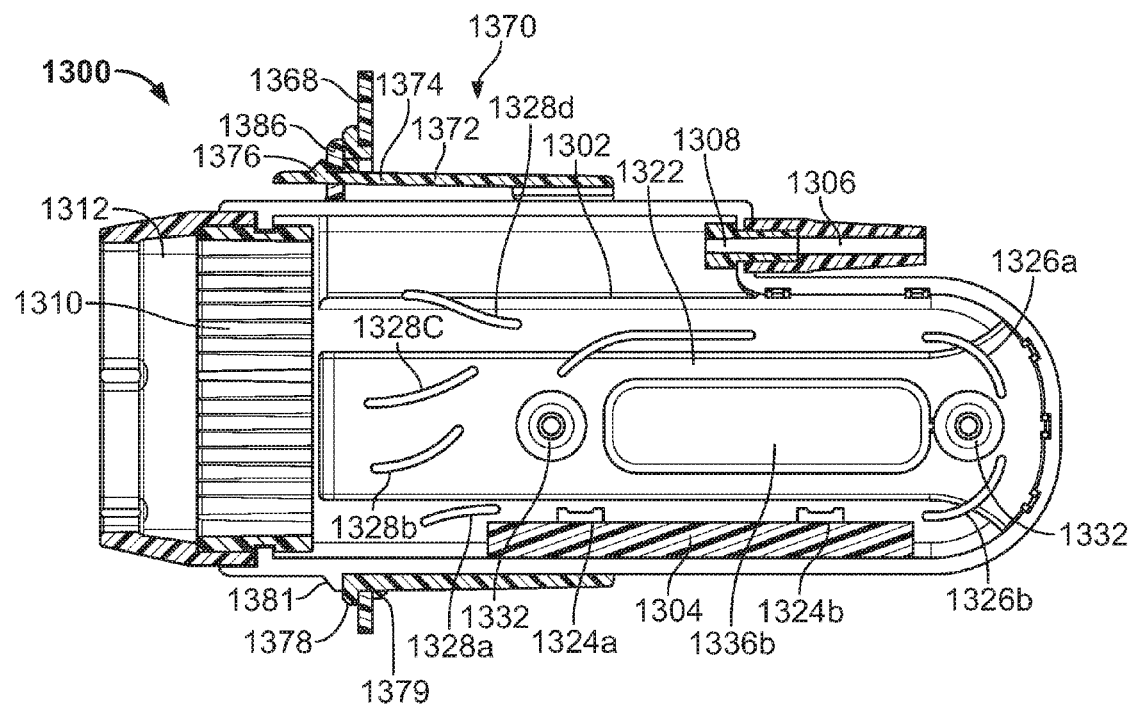
FIG. 13 is a cross-sectional view of a splitter module according to another embodiment and a splitter module holder according to another embodiment.

FIG. 13 depicts a cross-sectional view of an optical component module mounting assembly according to another embodiment. In the embodiment illustrated in FIG. 13, the optical component module mounting assembly includes a splitter module 1300 and a module holder 1370. FIG. 14 illustrates a cross-sectional view of module holder 1370, and FIG. 15 illustrates splitter module 1300 at a position just before selective engagement with holder 1370.

Splitter module 1300 and holder 1370 includes similar components as the above described splitter module 1100 and holder 1170, and these parts are similarly numbered. Namely, splitter module 1300 includes a housing 1302, an optical splitter 1304, an input boot 1306, an input fan-out 1308, an output fan-out 1310, and an output boot 1312. Housing 1302 also includes cable guides 1326a and 1326b, and a plurality of terminal cable guides 1328a, 1328b, 1328c, and 1328d.

Similar to splitter module 1100 and holder 1170, splitter module 1300 is configured to selectively couple with module holder 1370 that is configured to be coupled to a mounting surface 1368. In turn, splitter module 1300 is securely mounted to mounting surface 1368. Module holder 1370 can be sized to be closely received within an opening defined by mounting surface 1368. In some embodiments, module holder 1370 is sized and shaped to achieve a friction fit or a snap fit with mounting surface 1368. In other embodiments, module holder 1370 is secured to mounting surface 1368 using any other suitable attachment method, for example, by using fasteners or adhesives.

In some embodiments, module holder 1370 includes a main body 1372 that defines a channel. The shape of the channel defined by main body 1372 closely corresponds to the shape of splitter module 1300. For example, main body 1372 can define a generally rectangular channel sized to closely receive generally rectangular splitter module 1300. Accordingly, splitter module 1300 can slide within the channel defined by main body 1372.

Module holder 1370 can also include a latch for selectively engaging splitter module 1300 to substantially prevent splitter module 1300 from moving relative to module holder 1370, which effectively secures splitter module 1300 to mounting surface 1368 to which module holder 1370 is attached. In some embodiments, when splitter module 1300 is coupled with module holder 1370, splitter module 1300 is substantially prevented from both translating and rotating relative to module holder 1370.

In some embodiments, the latch can be a spring arm 1374 that selectively engages splitter module 1300. For example, main body 1372 of holder 1370 can define a pair of slots (not shown in FIGS. 13-15), and the portion of main body 1372 between the slots form spring arm 1374. Spring arm 1374 is configured to create a snap fit with splitter module 1300. Spring arm 1374 is resilient such that spring arm 1374 recoils after being flexed away from or towards the center of the channel defined by main body 1372.

In some embodiments, spring arm 1374 includes a protrusion 1376 that extends from a surface of spring arm 1374 away from a center of the channel defined by main body 1372. In some embodiments, splitter module 1300 includes a flange 1386 extending from a surface of housing 1302. As best seen in FIG. 15, flange 1386 defines an opening 1590.

In some embodiments, as shown in FIGS. 13-15, holder 1370 can have a spring arm 1374 that extends beyond a mounting flange 1378 of holder 1370. For example, mounting flange 1378 can define an opening 1488 through which spring arm 1374 extends. In such embodiments, a gap 1477 is formed between protrusion 1376 and mounting flange 1378. Gap 1477 can have a length that corresponds to the thickness of flange 1386 of splitter module 1300. Opening 1590 is sized and shaped to receive there through protrusion 1376 of spring arm 1374. Once protrusion 1376 passes through opening 1590, the bias of spring arm 1374 cause protrusion 1376 to move away from the center of the channel defined by main body 1372 and against a surface of flange 1386 to create a snap fit that substantially prevents movement of splitter module 1300 relative to module holder 1370, which effectively secures splitter module 1300 to mounting surface 1368. A face of protrusion 1376 that faces flange 1386 can be slanted to promote insertion of protrusion 1376 into opening 1590.

In some embodiments, holder 1370 includes a mounting flange 1378. Mounting flange 1378 extends from a surface of main body 1372. Accordingly, when main body 1372 is inserted through the opening defined by mounting surface 1368, a surface of mounting flange 1378 contacts mounting surface 1368, preventing further insertion of holder 1370 through the opening defined in mounting surface 1368. In some embodiments, mounting flange 1378 extends around the entire periphery of main body 1372 of holder 1370.

In some embodiments, as best seen in FIGS. 13 and 14, holder 1370 includes a second mounting flange 1379 forming a gap between second mounting flange 1379 and first mounting flange 1378. Second mounting flange 1379 may surround only a portion of the periphery of main body 1372. In such embodiments having second mounting flange 1379, the gap between mounting flange 1378 and mounting flange 1379 is sized to closely correspond to the thickness of mounting surface 1368. Accordingly, the edge of the opening defined in mounting surface 1368 can be placed in the gap between mounting flange 1378 and mounting flange 1379.

In some embodiments, splitter module 1300 can include a mounting flange 1381 extending outward from an outer surface of housing 1302. Accordingly, when splitter module 1300 is inserted through the channel defined by main body 1372 of module holder 1370, a surface of mounting flange 1381 contacts a surface of module holder 1370, for example, a surface of mounting flange 1378 of module holder 1370, or mounting surface 1368. This engagement can prevent splitter module 1300 from being further inserted through the channel defined by main body 1372 of module holder 1370. In some embodiments, mounting flange 1381 extends around the entire periphery of housing 1302 of splitter module 1300. In some embodiments, mounting flange 1381 extends around a portion of the periphery of housing 1302. In some embodiments, mounting flange 1381 is integral with flange 1386.

As best seen in FIG. 14, holder 1370 has a length 1484. In some embodiments, length 1484 is sufficient to substantially prevent rotation of splitter module 1300 relative to mounting surface 1368. For example, in some embodiments, length 1484 is equal to or greater than about twenty percent of the length of housing 1302 of splitter module 1300. In some embodiments, length 1484 is about twenty-five percent of the length of housing 1302 of splitter module 1300. In some embodiments, length 1484 is about one-third the length of housing 1302 of splitter module 1300. Accordingly, one end of splitter module 1300 extends past the corresponding end of module holder 1370 when splitter module 1300 is coupled with module holder 1370. In some embodiments, instead of splitter modules 1100 and 1300, the optical component module can be a monitor, wavelength digital multiplexer, or any other fiber-optic optical component module.

Figure 16:
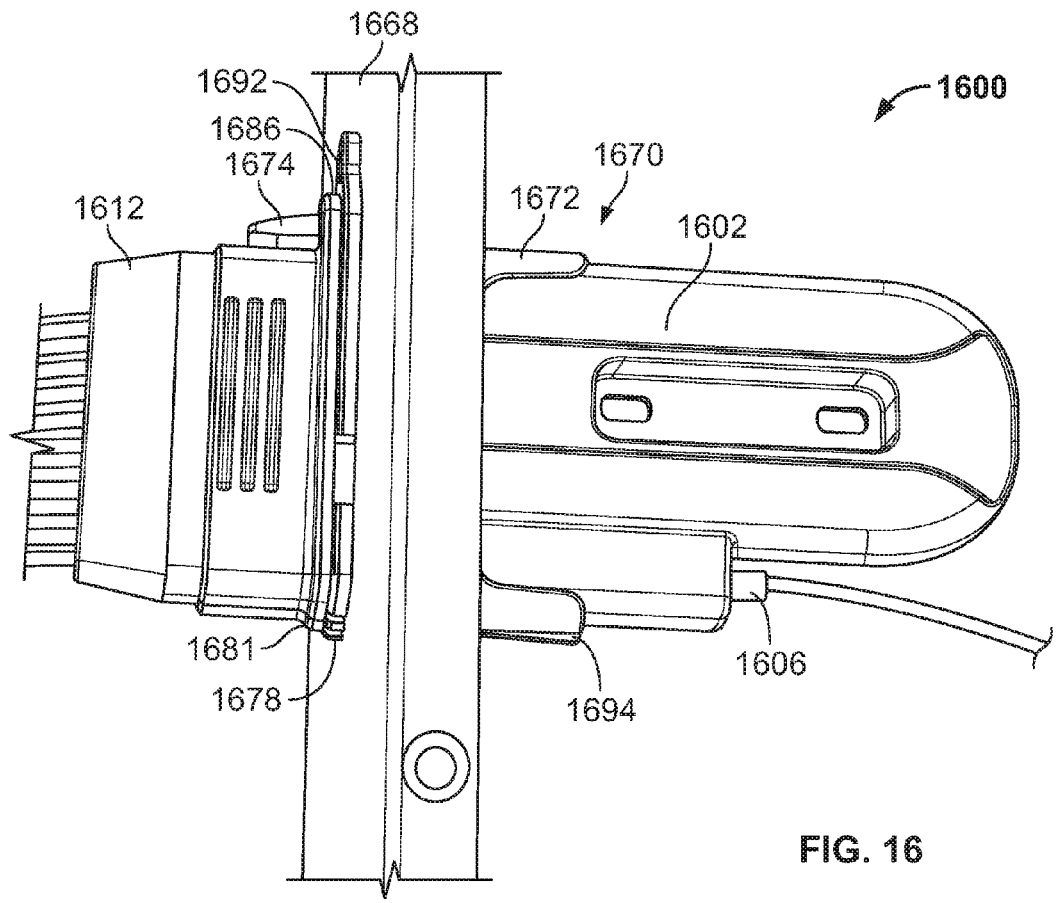
FIG. 16 is a side view of a splitter module according to another embodiment and a splitter module holder according to another embodiment.
Figure 17:
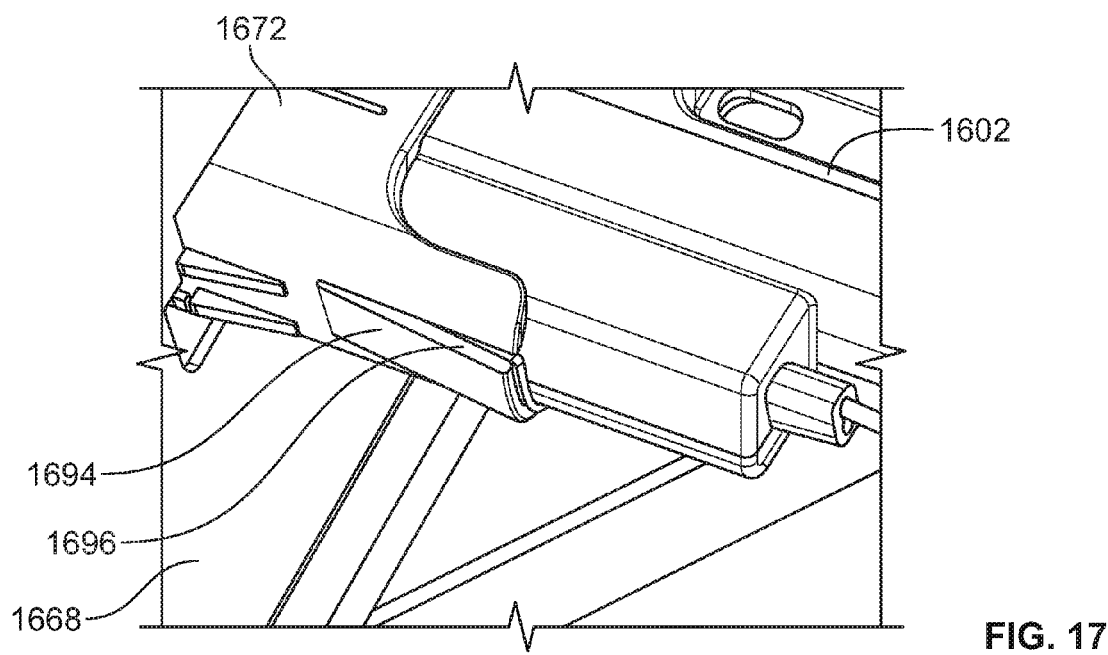
FIG. 17 is a perspective view of the splitter module and module holder illustrated in FIG. 16.

FIG. 16 depicts a side view of an optical component module mounting assembly according to another embodiment. In the embodiment illustrated in FIG. 16, the optical component module mounting assembly includes a splitter module 1600 and a module holder 1670. FIG. 17 illustrates a perspective view of module holder 1670 engaged with splitter module 1600.

Splitter module 1600 and holder 1670 includes similar components as the above described splitter modules 1100 and 1300 and holders 1170 and 1370, and these parts are similarly numbered. Namely, splitter module 1600 includes a housing 1602 which encases optical components, for example, one or more optical splitters, fan-out devices, and cable guides (not shown). Splitter module 1600 also includes an input boot 1606 and an output boot 1612.

Similar to splitter modules 1100 and 1300 and holders 1170 and 1370, splitter module 1600 is configured to selectively couple with module holder 1670 that is configured to be coupled to a mounting surface 1668. In turn, splitter module 1600 is securely mounted to mounting surface 1668. Module holder 1670 can be sized to be closely received within an opening defined by mounting surface 1668. In some embodiments, module holder 1670 is sized and shaped to achieve a friction fit or a snap fit with mounting surface 1668. In some embodiments, module holder 1670 is secured to mounting surface 1668 using any other suitable attachment method. For example, as shown in FIG. 16, module holder 1670 is secured to mounting surface 1668, at least in part, by one or more fasteners 1692.

In some embodiments, module holder 1670 includes a main body 1672 that defines a channel. The shape of the channel defined by main body 1672 closely corresponds to the shape of splitter module 1600. For example, main body 1672 can define a generally rectangular channel sized to closely receive generally rectangular splitter module 1600. Accordingly, splitter module 1600 can slide within the channel defined by main body 1672.

Module holder 1670 can also include a latch for selectively engaging splitter module 1600 to substantially prevent splitter module 1600 from moving relative to module holder 1670, which effectively secures splitter module 1600 to mounting surface 1668 to which module holder 1670 is attached. In some embodiments, when splitter module 1600 is coupled with module holder 1670, splitter module 1600 is substantially prevented from both translating and rotating relative to module holder 1670.

In some embodiments, the latch can be a first spring arm 1674 that selectively engages splitter module 1600. For example, main body 1672 of holder 1670 can define a pair of slots (not shown in FIGS. 16-17), and the portion of main body 1672 between the slots form first spring arm 1674. First spring arm 1674 is configured to create a snap fit with splitter module 1600. First spring arm 1674 is resilient such that spring arm 1674 recoils after being flexed away from or towards the center of the channel defined by main body 1672.

In some embodiments, spring arm 1674 includes a protrusion that extends from a surface of spring arm 1674 away from a center of the channel defined by main body 1672. In some embodiments, splitter module 1600 includes a flange 1686 extending from a surface of housing 1602. Flange 1686 can define an opening.

In some embodiments, as shown in FIG. 16, holder 1670 can have a spring arm 1674 that extends beyond a mounting flange 1678 of holder 1670. For example, mounting flange 1678 can define an opening through which spring arm 1674 extends. In such embodiments, a gap is formed between the protrusion of spring arm 1674 and mounting flange 1678. This gap can have a length that corresponds to the thickness of flange 1686 of splitter module 1600. The opening of flange 1686 is sized and shaped to receive there through the protrusion of spring arm 1674. Once the protrusion of spring arm 1674 passes through the opening of flange 1686, the bias of spring arm 1674 causes the protrusion of spring arm 1674 to move away from the center of the channel defined by main body 1672 and against a surface of flange 1686 to create a snap fit that substantially prevents movement of splitter module 1600 relative to module holder 1670, which effectively secures splitter module 1600 to mounting surface 1668. A face of the protrusion of spring arm 1674 that faces flange 1686 can be slanted to promote insertion of the protrusion of spring arm 1674 into the opening of flange 1686.

In some embodiments, holder 1670 includes a mounting flange 1678. Mounting flange 1678 extends from a surface of main body 1672. Accordingly, when main body 1672 is inserted through the opening defined by mounting surface 1668, a surface of mounting flange 1678 contacts mounting surface 1668, preventing further insertion of holder 1670 through the opening defined in mounting surface 1668. In some embodiments, mounting flange 1678 extends around the entire periphery of main body 1672 of holder 1670.

In some embodiments, splitter module 1600 can include a mounting flange 1681 extending outward from an outer surface of housing 1602. Accordingly, when splitter module 1600 is inserted through the channel defined by main body 1672 of module holder 1670, a surface of mounting flange 1681 contacts a surface of module holder 1670, for example, a surface of mounting flange 1678 of module holder 1670, or mounting surface 1668. This engagement can prevent splitter module 1600 from being further inserted through the channel defined by main body 1672 of module holder 1670. In some embodiments, mounting flange 1681 extends around the entire periphery of housing 1602 of splitter module 1600. In some embodiments, mounting flange 1681 extends around a portion of the periphery of housing 1602. In some embodiments, mounting flange 1681 is integral with flange 1686.

In some embodiments, as best seen in FIG. 17, module holder 1670 can include a second spring arm 1694 that selectively engages splitter module 1600. For example, main body 1672 of holder 1670 can define a pair of slots 1696 (one of which is illustrated in FIG. 17), and the portion of main body 1672 between the slots forms second spring arm 1694. Second spring arm 1694 is configured to apply a force in a direction generally perpendicular to the channel defined by main body 1672. In some embodiments, such application of force can substantially prevent splitter module 1600 from rotating relative to module holder 1670, which may result from first spring arm 1674 applying a force on flange 1686. Second spring arm 1694 is resilient such that second spring arm 1684 recoils after being flexed away from the center of the channel defined by main body 1672.

Second spring arm 1694 is configured to extend in a direction opposite from the direction first spring arm 1674 extends. For example, as shown in FIG. 16, first spring arm 1674 terminates on a first side of mounting surface 1668, and second spring arm 1694 terminates on a second and opposite side of mounting surface 1668.

In some embodiments, second spring arm 1684 includes a protrusion that extends from a surface of second spring arm 1694 away towards a center of the channel defined by main body 1672. The protrusion of second spring arm 1684 can be configured to contact splitter module 1600 to apply the counter force.

Figure 18:
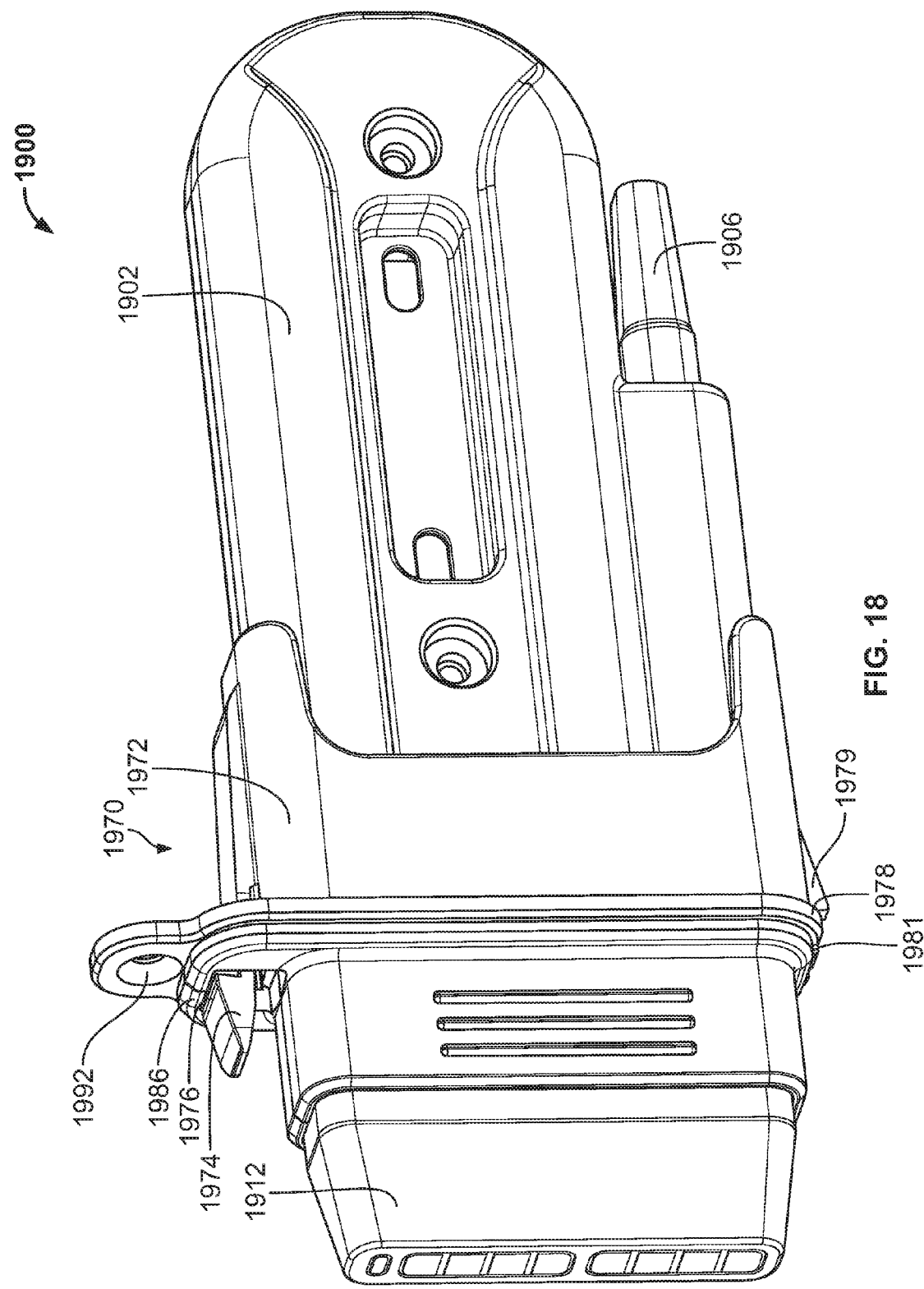
FIG. 18 is a perspective view of a splitter module according to another embodiment and a splitter module holder according to another embodiment.
Figure 19:
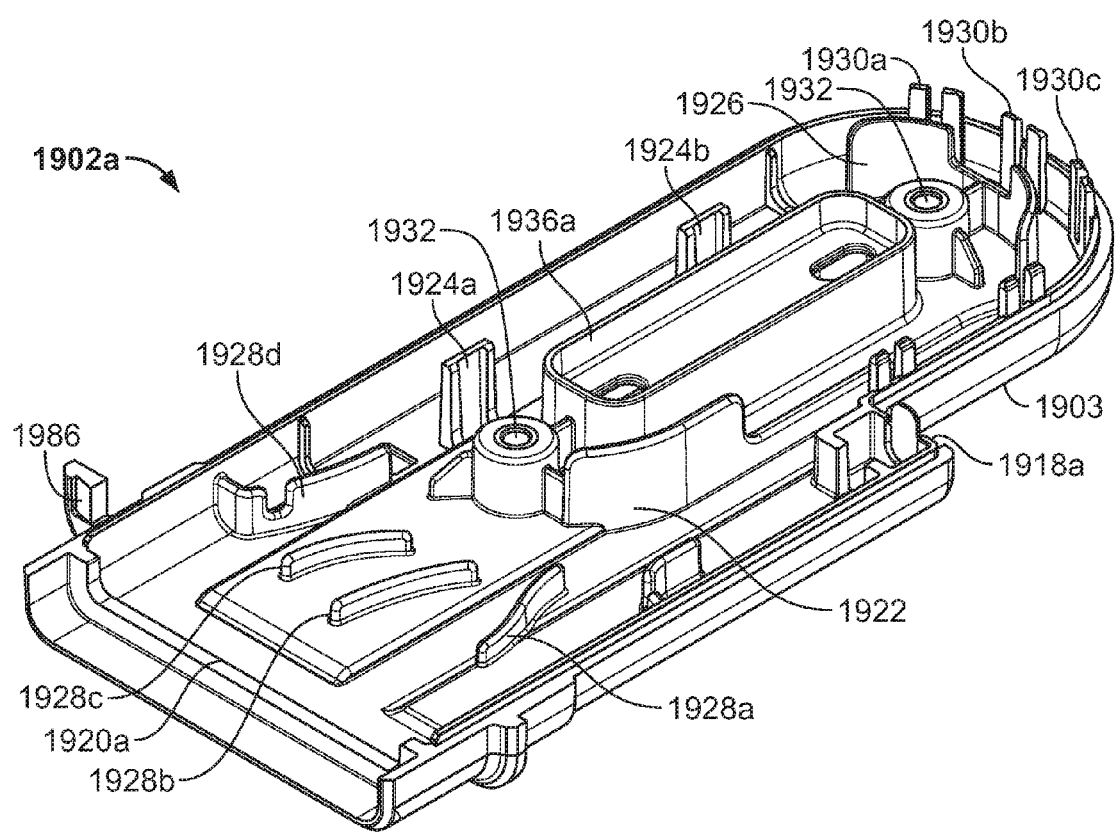
FIG. 19 is a perspective view of a portion of a housing as illustrated in FIG. 18.
Figure 20:
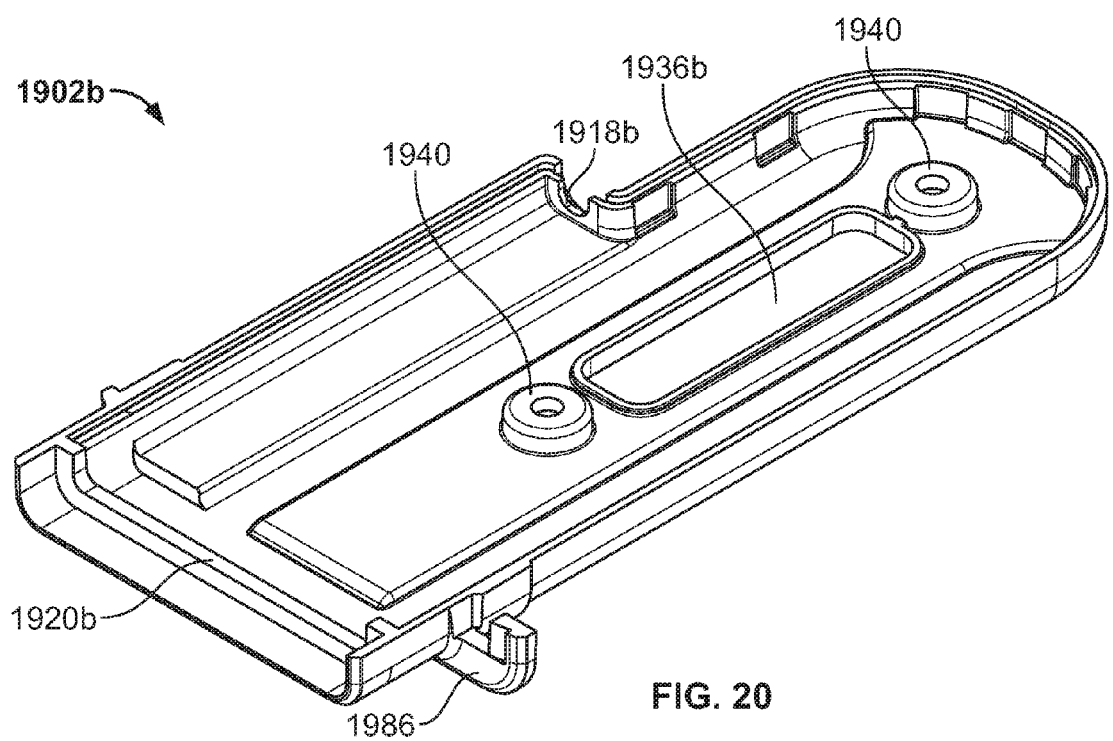
FIG. 20 is a perspective view of the other portion of the housing as illustrated in FIG. 18.
Figure 21:
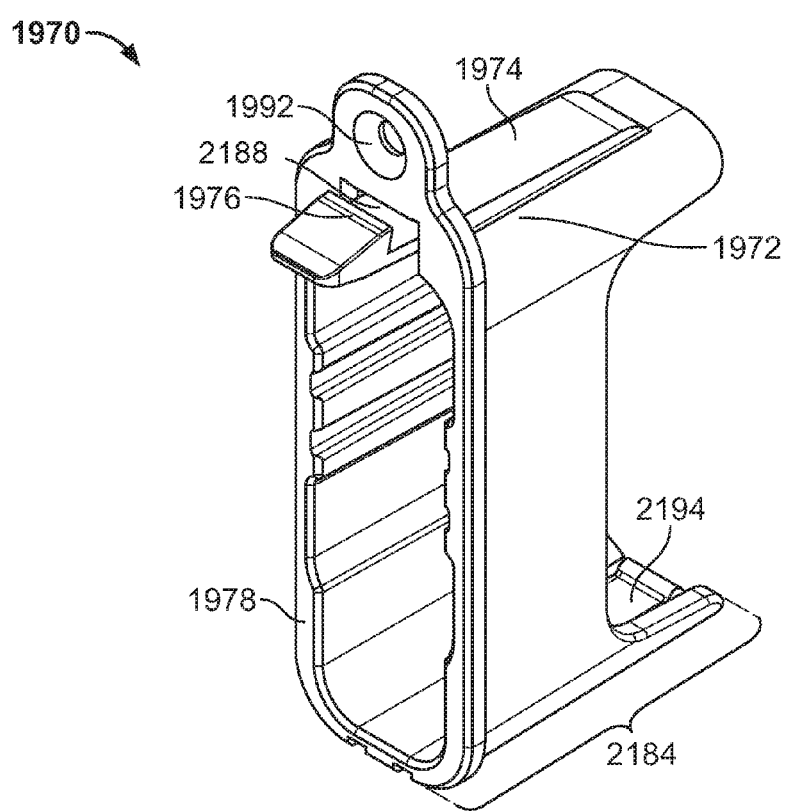
FIG. 21 is a perspective view of the splitter module as illustrated in FIG. 18.

FIG. 18 illustrates a splitter module 1900 engaged with a module holder 1970 according to another embodiment (not showing a mounting surface). FIGS. 19 and 20 are perspective views of housing portions 1902a and 1902b of splitter module 1900 as illustrated in FIG. 18. FIG. 21 is a perspective view of module holder 1970.

Splitter module 1900 and module holder 1970 include similar components as the above described splitter modules 100, 200, 1100, 1300, and 1600 and module holders 1170, 1370, and 1670, which are similarly numbered. Namely, splitter module 1900 includes a housing 1902 made of first and second housing portions 1902a and 1902b, an input boot 1906, an input fan-out (not shown), an output fan-out (not shown), an output boot 1912.

First housing portion 1902a and second housing portion 1902b can be selectively coupled to each other. Housing portion 1902a defines a first opening 1918a that allows one or more fiber optic cables (not shown) to enter housing 1902. First opening 1918a is between the ends of housing portion 1902a. In other embodiments, first opening 1918a can be located at or close one of the ends of housing 1902.

The incoming fiber optic cable(s) enter through opening 1918a and are routed to an optical splitter (not shown). Housing portion 1902a includes a retaining mechanism for securing the optical splitter within housing 1902. As shown in FIG. 19, housing portion 1902a includes retention posts 1924a and 1924b that extend from the inner surface of housing's sidewall. Retention posts 1924a and 1924b clamp the optical splitter against the sidewall of housing portion 1902a. In other embodiments, housing portion 1902a can include only one retention post or more than two retention posts.

The split fiber optic output cables (not shown) exit the optical splitter and travel against a first cable guide 1926. First cable guide 1926 extends from the inner surface of the housing's sidewall at one end. As shown in FIG. 19, first cable guide 1926 is substantially semi-circular and substantially concentric with the housing's outer wall. The curved portions of first cable guide 1926 have a radius greater than the minimum bend radius of the split fiber optic cables.

After first cable guide 1926, the split fiber optic cables travel to a second cable guide 1922. Second cable guide 1922 extends from the inner surface of housing's sidewall. The radius of any curved portion of second cable guide 1922 is greater than the minimum bend radius of the split fiber optic cables.

Housing portion 1902a also includes one or more terminal cable guides that extend from the inner surface of the housing's sidewall. The terminal cable guides spread out the split fiber optic cables across the width of housing 1902 before reaching an outlet end of housing 1902. In one example, as shown in FIG. 19, housing portion 1902a includes four terminal cable guides 1928a, 1928b, 1928c, and 1928d (collectively referred to as terminal cable guides 1928). First terminal cable guide 1928a may have an elongated S-shape, and second, third, and fourth terminal cable guides 1928b, 1928c, and 1928d may be substantially arcuate. The curved portions of terminal cable guides 1928 have a radius greater than the minimum bend radius of the split fiber optic cables.

Housing portion 1902a also define a second opening 1920a at or close to the outlet end of housing 1902. Second opening 1920a allows the split fiber optic cables to exit housing 1902. One or more alignment pins extend from housing portion 1902a. As illustrated in FIG. 19, three alignment pins 1930a, 1930b, and 1930c (collectively referred to as alignment pins 130) extend from housing portion 1902a. Alignment pins 1930a, 1930b, and 1930c are configured to be received by the other housing portion 1902b, which ensures that housing portion 1902a is properly aligned with housing portion 1902b.

Housing portion 1902a further includes one or more fastener receptacles 1932. Each fastener receptacle 1932 is configured to securely receive a fastener extending from housing portion 1902b to couple housing portion 1902b with housing portion 1902a.

Housing portion 1902a also defines an indentation 1936a. In some embodiments, indentation 1936a strengthens housing 1902.

Additionally, housing portion 1902a has a flange 1986 extending from a surface of housing 1902. Flange 1986 can define an opening.

FIG. 20 illustrates housing portion 1902b of housing 1902. Housing portion 1902b is substantially a mirror image of housing portion 1902a. Housing portion 1902b defines an opening 118b. Opening 1918b aligns with opening 1918a of housing portion 1902a when housing portions 1902b and 1902a are coupled, collectively forming an outlet opening in housing 1902 referred to as opening 1918. Similarly, housing portion 1902b defines opening 1920b that aligns with opening 1920b of housing portion 1902b when housing portions 1902a and 1902b are coupled. Housing portion 1902b further defines one or more openings 1940 for receiving a fastener. Openings 1940 are aligned with fastener receptacles 1932 of housing portion 1902a when housing portions 1902a and 1902b are coupled. Accordingly, a fastener, such as a screw, bolt, or any other suitable fastener, passes through opening 1940 and into secure engagement with a fastener receptacle 1932, securing housing portion 1902a to housing portion 1902b. Housing portion 1902b further defines an opening 1936b that corresponds with indentation 1936a in housing portion 1902a.

In some embodiments, module holder 1970 includes a main body 1972 that defines a channel. The shape of the channel defined by main body 1972 closely corresponds to the shape of splitter module 1900 so that splitter module 1900 can slide within the channel defined by main body 1972.

Module holder 1970 can also include a latch for selectively engaging splitter module 1900 to substantially prevent splitter module 1900 from moving relative to module holder 1970, which effectively secures splitter module 1900 to a mounting surface (not shown) to which module holder 1970 is attached. In some embodiments, when splitter module 1900 is coupled with module holder 1970, splitter module 1900 is substantially prevented from both translating and rotating relative to module holder 1970.

In some embodiments, the latch can be a first spring arm 1974 that selectively engages splitter module 1900. First spring arm 1974 is configured to create a snap fit with splitter module 1900. First spring arm 1974 is resilient such that spring arm 1974 recoils after being flexed away from or towards the center of the channel defined by main body 1972.

In some embodiments, spring arm 1974 includes a protrusion 1976 that extends from a surface of spring arm 1974 away from a center of the channel defined by main body 1972. Spring arm 1974 extends beyond a mounting flange 1978 of holder 1970. Mounting flange 1978 can define an opening 2188 through which spring arm 1974 extends. In such embodiments, a gap is formed between the protrusion of spring arm 1974 and mounting flange 1978. This gap can have a length that corresponds to the thickness of flange 1986 of splitter module 1900. The opening of flange 1986 is sized and shaped to receive there through protrusion 1976 of spring arm 1974. Once protrusion 1976 of spring arm 1974 passes through the opening of flange 1986, the bias of spring arm 1974 causes the protrusion of spring arm 1974 to move away from the center of the channel defined by main body 1972 and against a surface of flange 1986 to create a snap fit that substantially prevents movement of splitter module 1900 relative to module holder 1970, which effectively secures splitter module 1900 to a mounting surface (not shown). A face of the protrusion of spring arm 1974 that faces flange 1986 can be slanted to promote insertion of protrusion 1976 of spring arm 1974 into the opening of flange 1986.

Mounting flange 1978 extends from a surface of main body 1972. Accordingly, when main body 1972 is inserted through the opening defined by a mounting surface, a surface of mounting flange 1978 contacts the mounting surface, preventing further insertion of holder 1970 through the opening defined in mounting surface 1968. In some embodiments, mounting flange 1978 extends around the entire periphery of main body 1972 of holder 1970. Mounting flange 1978 can also define an opening 1992 for receiving fasteners that couple module holder 1970 to the mounting surface.

Splitter module 1900 can include a mounting flange 1981 extending outward from an outer surface of housing 1902. Accordingly, when splitter module 1900 is inserted through the channel defined by main body 1972 of module holder 1970, a surface of mounting flange 1981 contacts a surface of module holder 1970, for example, a surface of mounting flange 1978 of module holder 1970, or a mounting surface. This engagement can prevent splitter module 1900 from being further inserted through the channel defined by main body 1972 of module holder 1970. In some embodiments, mounting flange 1981 extends around the entire periphery of housing 1902 of splitter module 1900. In some embodiments, mounting flange 1981 extends around a portion of the periphery of housing 1902. In some embodiments, mounting flange 1981 is integral with flange 1986.

In some embodiments, as best seen in FIG. 21, module holder 1970 can include a second spring arm 2194 that selectively engages splitter module 1900. For example, main body 1972 of holder 1970 can define a pair of slots, and the portion of main body 1972 between the slots forms second spring arm 1994. Second spring arm 1994 is configured to apply a force in a direction generally perpendicular to the channel defined by main body 1972. In some embodiments, such application of force can substantially prevent splitter module 1900 from rotating relative to module holder 1970, which may result from first spring arm 1974 applying a force on flange 1986. Second spring arm 1994 is resilient such that second spring arm 1984 recoils after being flexed away from the center of the channel defined by main body 1972. Second spring arm 1994 is configured to extend in a direction opposite from the direction first spring arm 1974 extends. Second spring arm 1984 includes a protrusion that extends from a surface of second spring arm 1994 towards a center of the channel defined by main body 1972. The protrusion of second spring arm 1984 can be configured to contact splitter module 1900 to apply the counter force.

In some embodiments, as best in FIG. 18, holder 1970 includes at least one second mounting flange 1979 forming a gap between second mounting flange 1979 and first mounting flange 1978. Second mounting flange 1979 may surround only a portion of the periphery of main body 1972. In such embodiments having second mounting flange 1979, the gap between mounting flange 1978 and mounting flange 1979 is sized to closely correspond to the thickness of the mounting surface. Accordingly, the edge of the opening defined in the mounting surface can be placed in the gap between mounting flange 1978 and mounting flange 1979.

As seen in FIG. 21, holder 1970 has a length 2184 that is sufficient to substantially prevent rotation of splitter module 1900 relative to the mounting surface. For example, length 2184 is equal to or greater than about twenty percent of the length of housing 1902 of splitter module 1900. Accordingly, one end of splitter module 1900 extends past the corresponding end of module holder 1970 when splitter module 1900 is coupled with module holder 1970.

In some embodiments, the mounting surfaces, for example, mounting surfaces 1168, 1368, and 1668 comprise a panel of a rack-mountable chassis or a panel of a fiber distribution hub.

In some embodiments, the input fiber opening(s) and the output fiber opening(s) of splitter modules 100, 200, 1100, 1300, 1600, and 1900 are positioned at or close to the same end of the splitter module. In some embodiments, the input fiber opening(s) of splitter modules 1100, 1300, 1600, and 1900 are positioned such that when the splitter modules 1100, 1300, 1600, and 1900 are engaged with module holders 1170, 1370, 1670, and 1970, respectively, the input fiber opening(s) are on the same side as spring arms 1174, 1374, 1674, and 1974, respectively. In some embodiments, the input fiber opening(s) of splitter modules 1100, 1300, 1600, and 1900 are positioned such that when the splitter modules 1100, 1300, 1600, and 1900 are engaged with module holders 1170, 1370, 1670, and 1970, respectively, the input fiber opening(s) are on the opposite side of spring arms 1174, 1374, 1674, and 1974, respectively.

In some embodiments, splitter modules 100, 200, 1100, 1300, 1600, and 1900 can include two or more optical splitters.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A fiber optic module mounting assembly comprising:
   a surface defining an opening;
   a module holder comprising a mounting flange and a body defining a channel, the body having a cross-sectional shape closely corresponding to a cross-sectional shape of the opening defined by the surface, wherein the mounting flange contacts the surface; and
   a module comprising a housing and an optical component within the housing, at least a portion of the housing having first and second opposing sides and a flange-free cross-sectional shape closely corresponding to a cross-sectional shape of the channel of the module holder, wherein the module is configured to be received within the channel defined by the body of the module holder, wherein each of the first and second opposing sides of the portion of the housing slidably contact the channel;
   wherein rotation of the module relative to the surface is substantially prevented when the housing of the module is received within the channel defined by the body of the module holder.

2. The fiber optic module mounting assembly of claim 1, wherein the channel is configured to receive a single module.

3. The fiber optic module mounting assembly of claim 1, wherein the module holder has a first length, and wherein the module has a second length greater than the first length.

4. The fiber optic module mounting assembly of claim 3, wherein the first length is at least about 20 percent of the second length.

5. The fiber optic module mounting assembly of claim 1, wherein the mounting flange extends from the body.

6. The fiber optic module mounting assembly of claim 5, wherein the mounting flange extends around an entire periphery of the body of the module holder.

7. The fiber optic module mounting assembly of claim 5, wherein the module further comprises a flange extending from the housing and configured to contact the mounting flange of the module holder when the housing of the module is received within the channel defined by the body of the module holder.

8. The fiber optic module mounting assembly of claim 7, wherein the flange of the module extends around an entire periphery of the module.

9. The fiber optic module mounting assembly of claim 1, wherein the optical component comprises at least one of a monitor, a splitter, and a wavelength digital multiplexer.

10. The fiber optic module mounting assembly of claim 1, wherein the surface comprises a panel of a rack-mountable chassis.

11. The fiber optic module mounting assembly of claim 1, wherein the surface comprises a panel of a fiber distribution hub.

12. The fiber optic module mounting assembly of claim 1, wherein the module holder further comprises a latch configured to selectively engage the module such that movement of the module relative to the module holder is prevented.

13. The fiber optic module mounting assembly of claim 12, wherein the latch is a spring arm.

14. The fiber optic module mounting assembly of claim 13, wherein the spring arm extends beyond the mounting flange.

15. The fiber optic module mounting assembly of claim 1, wherein the mounting flange defines an opening configured to receive a fastener.

16. The fiber optic module mounting assembly of claim 1, wherein the portion of the housing further comprises third and fourth opposing sides between the first and second opposing sides, wherein each of the third and fourth opposing sides of the portion of the housing slidably contact the channel.

17. The fiber optic module mounting assembly of claim 1, wherein the optical component is between the first and second opposing sides.

18. The fiber optic module mounting assembly of claim 1, wherein the module holder further comprises a second mounting flange disposed relative to the mounting flange so as to provide a gap configured to receive an edge of the surface defining the opening of the surface.

* * * * *